United States Patent
Faulkner

(10) Patent No.: US 10,764,297 B2
(45) Date of Patent: Sep. 1, 2020

(54) ANONYMIZED PERSONA IDENTIFIER

(71) Applicant: ThreatMETRIX PTY LTD, Chatswood NSW (AU)

(72) Inventor: Alisdair Faulkner, Potts Point (AU)

(73) Assignee: ThreatMETRIX PTY LTD, Chatswood NSW (AU)

( * ) Notice: Subject to any disclaimer, the term of this patent is extended or adjusted under 35 U.S.C. 154(b) by 166 days.

(21) Appl. No.: 16/131,292

(22) Filed: Sep. 14, 2018

(65) Prior Publication Data

US 2019/0089711 A1    Mar. 21, 2019

Related U.S. Application Data

(60) Provisional application No. 62/559,480, filed on Sep. 15, 2017.

(51) Int. Cl.
| | |
|---|---|
| *H04L 29/06* | (2006.01) |
| *G06Q 20/38* | (2012.01) |
| *G06F 21/62* | (2013.01) |
| *G06Q 20/40* | (2012.01) |
| *H04L 29/08* | (2006.01) |

(52) U.S. Cl.
CPC ........ *H04L 63/102* (2013.01); *G06F 21/6254* (2013.01); *G06Q 20/383* (2013.01); *G06Q 20/4014* (2013.01); *G06Q 20/4016* (2013.01); *H04L 63/1425* (2013.01); *H04L 63/1433* (2013.01); *H04L 63/1441* (2013.01); *H04L 67/22* (2013.01); *H04L 67/02* (2013.01)

(58) Field of Classification Search
CPC ............... H04L 63/102; H04L 63/1425; H04L 63/1441; H04L 67/22; G06F 21/6251; G06Q 20/383

USPC .......................................................... 726/23
See application file for complete search history.

(56) References Cited

U.S. PATENT DOCUMENTS

| | | | |
|---|---|---|---|
| 9,626,680 B1* | 4/2017 | Ryan ................... | H04L 63/1491 |
| 2002/0099649 A1* | 7/2002 | Lee ..................... | G06Q 20/4016 |
| | | | 705/38 |
| 2011/0131122 A1* | 6/2011 | Griffin ................. | G06Q 40/08 |
| | | | 705/35 |
| 2014/0237570 A1* | 8/2014 | Shishkov ............. | G06F 21/316 |
| | | | 726/7 |
| 2015/0215334 A1* | 7/2015 | Bingham ............. | H04L 63/1425 |
| | | | 726/23 |
| 2016/0019546 A1* | 1/2016 | Eisen ................... | G06F 21/44 |
| | | | 705/44 |
| 2016/0203575 A1* | 7/2016 | Madhu ................. | G06F 21/577 |
| | | | 705/319 |
| 2016/0328715 A1* | 11/2016 | Gideoni ............... | G06Q 30/06 |
| 2019/0043054 A1* | 2/2019 | Crank .................. | G06F 21/316 |

* cited by examiner

*Primary Examiner* — Shin-Hon (Eric) Chen
*Assistant Examiner* — Dereena T Cattungal
(74) *Attorney, Agent, or Firm* — Troutman Pepper Hamilton Sanders LLP; James E. Schutz; Mark Lehi Jones

(57) ABSTRACT

Systems and methods are disclosed herein for tracking related and known attributes and/or online activities connected with a digital identity of an entity. In one embodiment, a computing apparatus is configured to associate unique, anonymous alphanumeric identifiers with an entity and to build a unique mapping of entity attributes/activities with associated temporal information to identify suspicious/outlier behaviors so that fraudulent account access or transactions may be prevented.

17 Claims, 13 Drawing Sheets

US 10,764,297 B2

ANONYMIZED PERSONA IDENTIFIER

CROSS REFERENCE TO RELATED APPLICATIONS

This application claims the benefit of U.S. Provisional Application No. 62/559,480, titled "Anonymized Persona Identifier," filed 15 Sep. 2018, the contents of which is fully incorporated herein by reference.

FIELD

The disclosed technology generally relates to internet security, and, to temporal event-driven identity resolution for the detection and prevention of cybercrimes.

BACKGROUND

As businesses worldwide become more reliant on the Internet for digital communications and transactions, the ever-increasing presence and sophistication of cybercrime requires new strategies to distinguish trusted customers from cybercriminals. Identity fraud presents difficult challenges for businesses and/or customers who unknowingly open accounts, allow transactions, etc., based on synthetic, stolen, or manipulated identity information. Technically well-informed fraud perpetrators continue to develop sophisticated deception schemes to target online transaction and authentication systems that were once thought to be secure. Identifying threats of online fraud in time to prevent cybercrimes presents significant challenges that may be addressed by implementations of the disclosed technology.

BRIEF SUMMARY

Some or all of the above needs may be addressed by certain implementations of the disclosed technology. Systems and methods are disclosed herein for tracking related and known attributes and/or online activities connected with a digital identity of an entity. In one embodiment, a computing apparatus is configured to associate unique, anonymous alphanumeric identifiers with an entity and to build a unique mapping of entity attributes/activities with associated temporal information to identify suspicious/outlier behaviors so that fraudulent account access or transactions may be prevented.

According to an example implementation, a system is provided. The system includes one or more processors, memory in communication with the one or more processors, and instructions stored in the memory that, when executed by the one or more processors, cause the system to: receive a plurality of attribute indications representing one or more of: a name, an email address, a physical address, a phone number, an IP address, a digital device identifier, an event, and a transaction; extract temporal information for each of the plurality of attribute indications; determine a linkage score for each of the plurality of attribute indications, wherein the linkage score represents a confidence that an attribute indication corresponds to an entity identifier; determine an anomaly score for one or more attribute variables associated with the entity identifier, wherein the anomaly score represents a deviation from normal behavior; determine an aggregate threat score for the entity identifier based on the linkage scores, the anomaly scores, and a weighting according to the temporal information; and responsive to the determined aggregate threat score being greater than a threshold score, grant or block electronic access to one or more of an electronic device and a web portal by an entity corresponding to the entity identifier.

In an another example implementation, a computer-implemented method is provided that includes receiving a plurality of attribute indications representing one or more of: a name, an email address, a physical address, a phone number, an IP address, a digital device identifier, an event, and a transaction; extracting temporal information for each of the plurality of attribute indications; determining, by a processor: a linkage score for each of the plurality of attribute indications, wherein the linkage score represents a confidence that an attribute indication corresponds to an entity identifier; an anomaly score for one or more attribute variables associated with the entity identifier, wherein the anomaly score represents a deviation from normal behavior; an aggregate threat score for the entity identifier based on the linkage scores, the anomaly scores, and a weighting according to the temporal information; and responsive to the determined aggregate threat score being greater than a threshold score, grant or block electronic access to one or more of an electronic device and a web portal by an entity corresponding to the entity identifier.

According to another example implementation, computer-readable media is provided. The computer-readable media includes computer-executable instructions that, when executed by one or more processors, cause the one or more processors to perform a method comprising: receiving a plurality of attribute indications representing one or more of: a name, an email address, a physical address, a phone number, an IP address, a digital device identifier, an event, and a transaction; extracting temporal information for each of the plurality of attribute indications; determining, by a processor: a linkage score for each of the plurality of attribute indications, wherein the linkage score represents a confidence that an attribute indication corresponds to an entity identifier; an anomaly score for one or more attribute variables associated with the entity identifier, wherein the anomaly score represents a deviation from normal behavior; an aggregate threat score for the entity identifier based on the linkage scores, the anomaly scores, and a weighting according to the temporal information; and responsive to the determined aggregate threat score being greater than a threshold score, grant or block electronic access to one or more of an electronic device and a web portal by an entity corresponding to the entity identifier.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

Reference will now be made to the accompanying figures and flow diagrams, which are not necessarily drawn to scale, and wherein.

DETAILED DESCRIPTION

Figure 1:
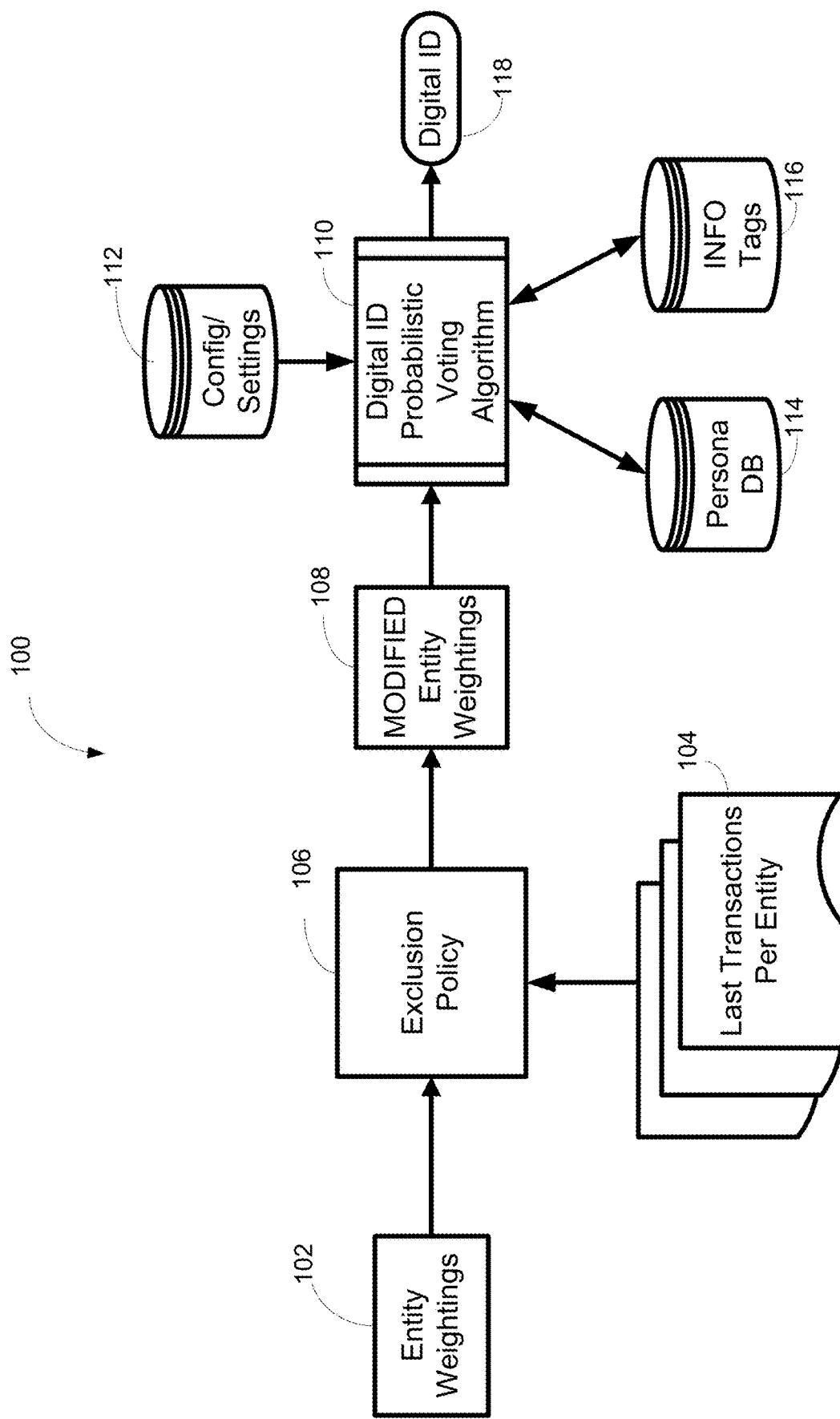
FIG. 1 is a block diagram of an illustrative process 100 for building a digital identity and mapping associated attributes, according to an example implementation of the disclosed technology.

Various example embodiments of the present disclosure now will be described more fully hereinafter with reference to the accompanying drawings, in which some, but not all embodiments of the disclosure are shown. This disclosed technology may, however, be embodied in many different forms and should not be construed as limited to the implementations set forth herein; rather, these implementations are provided so that this disclosure will be thorough and complete, and will convey the scope of the disclosed technology to those skilled in the art.

As utilized herein, the term "or" is used herein in both the alternative and conjunctive sense, unless otherwise indicated. The terms "illustrative" and "exemplary" are used to be examples with no indication of quality level. Like numbers refer to like elements throughout.

One objective of the disclosed technology is to identify fraudulent online behavior so that associated transactions and/or account access may be blocked. Certain example implementations of the disclosed technology determine connected entity attribute indications together with associated temporal information to build time-dependent digital mapping of entities that may be leveraged in a way that makes impersonation and other fraudulent activity more difficult to conceal.

Another objective of the disclosed technology is to build the digital mapping using anonymized persona identifiers, which may include unique, anonymous alphanumeric identifiers that pinpoint an entity (i.e., human, individual, and or grouping of individuals) and all related, known attributes connected to the entity's digital identities. Bridging data elements spanning the online and offline worlds, these related attributes may include devices, user names, email addresses, phone numbers ship-to addresses, payment card information, IP addresses, online activities, transactions, etc. The attributes, and the relationships between these attributes, are amassed through a global persona identity network, which can process millions of daily digital transactions, from tens of thousands of websites and mobile apps around the world.

Certain implementations of the disclosed technology may be utilized to identify individuals and/or networks associated with certain activities based on geographical and/or social network mapping. In one example implementation, a social network for an individual may be analyzed to determine geographical locations of associates, relatives, business partners, etc., relative to certain activities. According to one example implementation, the activities may be related to incidents of identity theft. In another example implementation, the activities may be related to online purchases, for example, where goods may be shipped to a vacant (or foreclosed) address and locally monitored or controlled by a person (for retrieval of the goods) without being linked to the address.

In an example embodiment, time-dependent digital mapping of information related to a digital identifier (associated with an entity) may be utilized to identify one or more probable perpetrators of crimes or individuals associated with certain activities. For example, in one embodiment, a person's time-dependent digital mapping may be analyzed for geographical proximities to locations associated with certain activities and/or geographical proximities to addresses of identity theft victims. In certain example embodiments, thresholds, weightings, etc., may be applied based on attributes of the information, and scoring may be performed to produce confidence levels that a particular entity may be involved in such activities.

In accordance with one example embodiment, a time-dependent digital mapping may be determined for every person in a given population. For example, embodiments of the disclosed technology may be utilized to determine time-dependent digital mapping for each person in the United States to determine individuals that are related in some way, including, but not limited to family, business associates, friends, past roommates, etc. In an example embodiment, locations, addresses, or regions of an activity (for example, addresses of identity theft victims) may be compared with current home and/or work addresses for the people in an individual's social network. In certain example embodiments, a distance may be calculated between such locations. According to an example embodiment, such data may be utilized to identify certain patterns, confidence values, scores, etc. In an example implementation, all members of the social network may be considered. In other example implementations, only individuals having certain connection criteria may be considered to reduce the computation complexity.

Certain embodiments of the disclosed technology may provide improved accuracy over conventional systems and techniques. For example, law enforcement departments attempting to identify perpetrators of certain fraudulent activities (such as identity theft) may utilize conventional focused analysis techniques that examine each event in isolation. The conventional techniques typically utilize high thresholds to filter the large number of events to be analyzed.

In other words, because the data that must be analyzed with conventional techniques is so large, a high degree of suspicious activity may be required in order to identify individuals or entities associated with the activity. Without a high threshold, conventional techniques may have too many potentially fraudulent events to investigate. As a result, entities using conventional techniques often overlook collusion from groups that are able to stay below these high thresholds with respect to certain suspicious activities.

The systems and methods disclosed herein may be capable of efficiently leveraging readily available data to help detect individuals involved with certain activities. According to an example implementation of the disclosed technology, the time-dependent digital mapping may start with large quantity of data and group that data into smaller, distinct units or networks. In an example embodiment, seemingly low risk activity within each network may be measured to identify potentially organized groups without having to apply low thresholds to the large amounts of data as a whole.

In one example embodiment, a domain of entities may be identified for analysis. For example, data associated with a large number (perhaps hundreds of millions) of individuals may be gathered for analysis. The data may include identities of individuals, organizations, companies, etc. According to certain example embodiments of the disclosed technology, one or more types of relationships between the entities may then be collected.

In certain embodiments, a filtering mechanism may operate against the networks and may retain those networks that have outlying behavior. Such filtering may conventionally utilize graph- or network analysis, and queries/filtering of this form may utilize sub-graph matching routines or fuzzy sub-graphs matching. However, sub-graph matching routines or fuzzy-sub-graphs matching techniques may be NP-complete, and thus, impractical for analyzing large sets of data. The most notable characteristic of NP-complete problems is that no fast solution to them is known. That is, the time required to solve the problem using any currently known algorithm increases very quickly as the size of the problem grows. This means that the time required to solve even moderately sized versions of many of these problems can easily reach into the billions or trillions of years, using any amount of computing power available today. Embodiments of the disclosed technology may be utilized to determine or provide connections between entities even though the set of data analyzed may be extremely large.

In accordance with an example implementation of the disclosed technology, entities may be identified and may include people, companies, places, objects, virtual identities, etc. In an example embodiment, relationships may be formed in many ways, and with many qualities. For example, co-occurrence of values in common fields in a database may be utilized, such as the same last name. Relationships may also be formed using multiple co-occurrence of an entity with one or more other properties, such as people who have lived at two or more addresses.

Relationships may also be formed based on a high reoccurrence and/or frequency of a common relationship, according to an example embodiment. For example, records of person X sending an email to person Y greater than N times may indicate a relationship between person X and person Y. In another example embodiment, if person X sends an email to or receives an email from person Y, and within a short period of time, person Z sends an email or receives an email from person Y, then a relationship may be implied between person X and person Z.

In accordance with an example implementation of the disclosed technology, relationships between entities may comprise Boolean, weighted, directed, undirected, and/or combinations of multiple relationships. According to certain example embodiments of the disclosed technology, clustering of the entities may rely on relationships steps. In one embodiment, entities may be related by at least two different relationship types. In one embodiment, relationships for the network connection analysis may be established by examining weights or strengths of connections between entities in certain directions and conditional upon other relationships, including temporal relationships. For example, in one embodiment, the directional relationships between entities X, Y, and Z may be examined and the connection between X, Y, and Z may be followed if there is a link between Y and Z happened (in time) after the link was established between X and Y.

Many methods may be utilized to filter networks once they are identified. For example, in one embodiment, networks may be scored. In another embodiment, a threshold may be utilized to identify networks of interest. According to an example embodiment of the disclosed technology, a model may be utilized to compute a number of statistics on each network. In one embodiment, the model may be as simple as determining counts. In another embodiment, the model may detect relationships within a network, for example, entities that are related to the centroid of the network that are also related to each other. This analysis may provide a measure of cohesiveness of relationships that exist inside the network. According to an example embodiment of the disclosed technology, once the statistics have been computed, scoring and weighting of each network may be utilized to determine which networks rise above a particular threshold, and may be classified as "interesting." In accordance with an example embodiment of the disclosed technology, and weighting and/or scoring of the determined statistics may be accomplished using a heuristic scoring model, such as linear regression, neural network analysis, etc.

Example implementations of the disclosed technology can utilize special-purpose computing systems and custom query language(s) in the processes described herein to provide meaningful results, as may be necessitated due to the sheer amount of data that needs to be tracked and analyzed.

Certain example implementations of the disclosed technology provide tangible improvements in computer processing speeds, memory utilization, and/or programming languages. Such improvements provide certain technical contributions that can enable the detection of relationships among individuals. In certain example implementations, the improved computer systems disclosed herein may enable analysis of an entire population, such as all known persons in the United States, together with associated activities. The computation of such a massive amount of data, at the scale required to provide effective outlier detection and information, has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing for effective relationship-linking. As disclosed herein, the special-purpose computers and special-purpose programming language(s) disclosed herein can provide improved computer speed and/or memory utilization that provide an improvement in computing technology, thereby enabling the disclosed inventions.

One of the issues that has plagued previous "relationship determination" solutions involving massive data sets is the extremely long run-times and large amount of memory/disk space required. One of the technical solutions provided by the technology disclosed herein concerns the enablement and efficiency improvement of computer systems and software to process relationship data, and to provide the desired data in a reasonable amount of time. Certain example implementations of the disclosed technology may be utilized to increase the efficiency of detection of identity-based fraud indicators.

Determining relationships among records, for example, can follow the classical n-squared process for both time and disk space. According to an example implementation of the disclosed technology, light-weight self-joins may be utilized, for example, in generating embeddable common lisp (ECL). But disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, linking of records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Data profiling, data hygiene and data source consistency checking, while key components of the record linking process, have their own value within the data integration process and may be utilized herein for leverage even when record linking is not a necessary part of a particular data work unit. Implementations of the disclosed technology may utilize concepts such as term specificity to determine the relevance/weight of a particular field in the scope of the linking process, and a mathematical model based on the input data, rather than the need for hand coded user rules, which may be key to the overall efficiency of the method.

Certain example implementations of the disclosed technology may be utilized to prevent fraud by verifying identities, activities, and other factors, and using relationship information to determine where collusive activities might exist.

In accordance with an example implementation of the disclosed technology, and as discussed above, a persistent data structure may be utilized as part of splitting a core join, for example, to increase the performance of the computer processor and/or to reduce the disc/memory utilization requirements in determining relationships among records. The persistent data structure, according to certain example implementations of the disclosed technology, is a data structure that preserves the previous version of itself when it is modified. Such data structures may be effectively immutable, as their operations do not update the structure in-place, but instead may yield a new updated structure. Certain example implementations may utilize a meld or merge operation that can create a new version from two previous versions. In certain example implementations, the persistent data structure(s) can also be created using in-place updating of data and these may, in general, use less time or storage space than their purely functional counterparts. In certain example implementations, persistence can be achieved by simple copying. Certain example implementations of the disclosed technology exploit a similarity between the new and old versions to share structure between versions.

Certain embodiments of the disclosed technology may enable the detection of possible, probable, and/or actual identity theft-related fraud, for example, as associated with a request for credit, payment, or a benefit. Certain example implementations provide for disambiguating input information and determining a likelihood of fraud. In certain example implementations, the input information may be received from a requesting entity in relation to a request for credit, payment, or benefit. In certain example implementations, the input information may be received from a requesting entity in relation to a request for an activity from a business or government agency. In certain example implementations, the entity may be a natural person (i.e., human). In other example implementations, the entity may be represented as a natural person, but may actually be associated with a synthetic identity.

In accordance with an example implementation of the disclosed technology, input information associated with an entity may be processed, weighted, scored, etc., for example, to disambiguate the information. Certain implementations, for example, may utilize one or more input data fields to verify or correct other input data fields.

Various systems and methods may be utilized to construct and utilize the attribute information, according to example implementations of the disclosed technology, and will now be described with reference to the accompanying figures.

FIG. 1 is a block diagram of an illustrative process 100 for building a digital identity (ID) associated with an entity, and mapping associated attributes to the digital ID, according to an example implementation of the disclosed technology. In block 102, initial weightings may be applied to a given entity for use with an exclusion policy 106. In certain example implementations, the weightings may represent a linkage score for received attribute indications and may represent a confidence that an attribute indication corresponds to an entity identifier. In block 104, transactions with associated temporal information (such as the date and/or time of the transaction) related to the entity may be utilized by the exclusion policy 106. In block 108, the exclusion policy 106 may be utilized to modify 108 the initial entity weightings.

Figure 5:
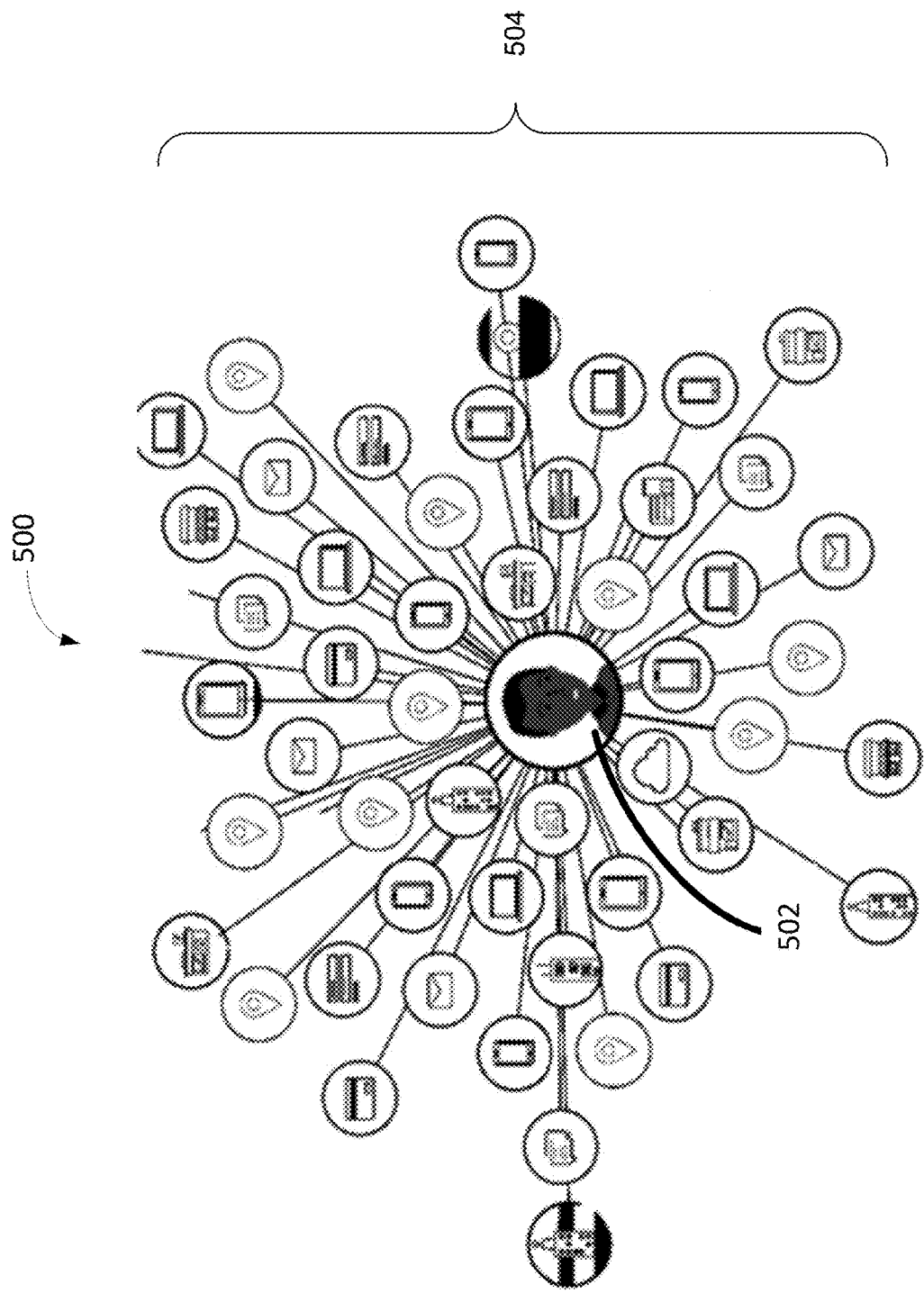
FIG. 5 is an illustrative graphical output mapping 500 of attributes associated with a digital identity 502, according to an example implementation of the disclosed technology.

In block 110, a probabilistic voting algorithm may receive the modified entity weightings 108, along with other various parameters such as configurations and/or settings 112, stored information from a persona database 114, and/or information tags 116. In accordance with certain example implementations of the disclosed technology, the combined input may be utilized to generate a digital ID 118 and associate mappings (for example, as illustrated in FIG. 5).

FIGS. 2A-2E illustrate connected block diagrams of a process 200 for starting, filtering, building, modifying, storing, etc., digital identity information according to an example implementation of the disclosed technology. Certain example implementations of the process 100 as illustrated in FIG. 1 may overlap with or be included in the detailed process 200 illustrated in FIGS. 2A-2E.

Figure 2A:
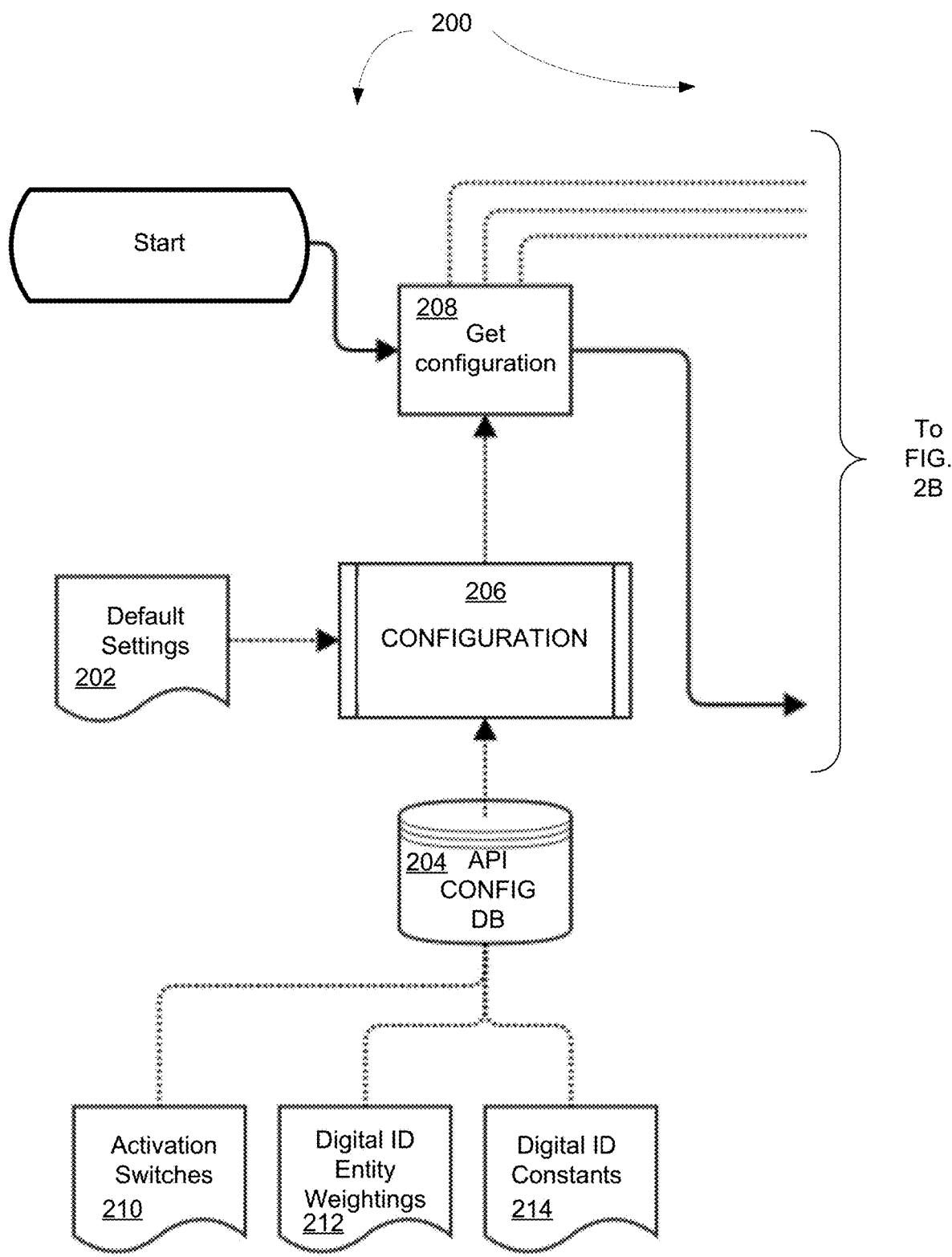
FIG. 2A is part of a block diagram of an example process 200 for building, modifying and/or storing digital identity information, according to an example implementation of the disclosed technology.

FIG. 2A depicts an initialization process 200 in which default settings 202 and information from an API configuration database 204 may be provided as input to a configuration file 206. In certain example implementations, the API configuration database 204 may receive information such as activation switches 210, digital ID entity weightings 212, and/or digital ID constants 214. In certain example implementations, each entity type and scope combination may be assigned a weighting 212 indicative of the statistical power associated with it depending upon it uniqueness. In accordance with an example implementation, a "start" indication may be utilized by block 208 to initiate retrieving the configuration data 206.

Figure 2B:
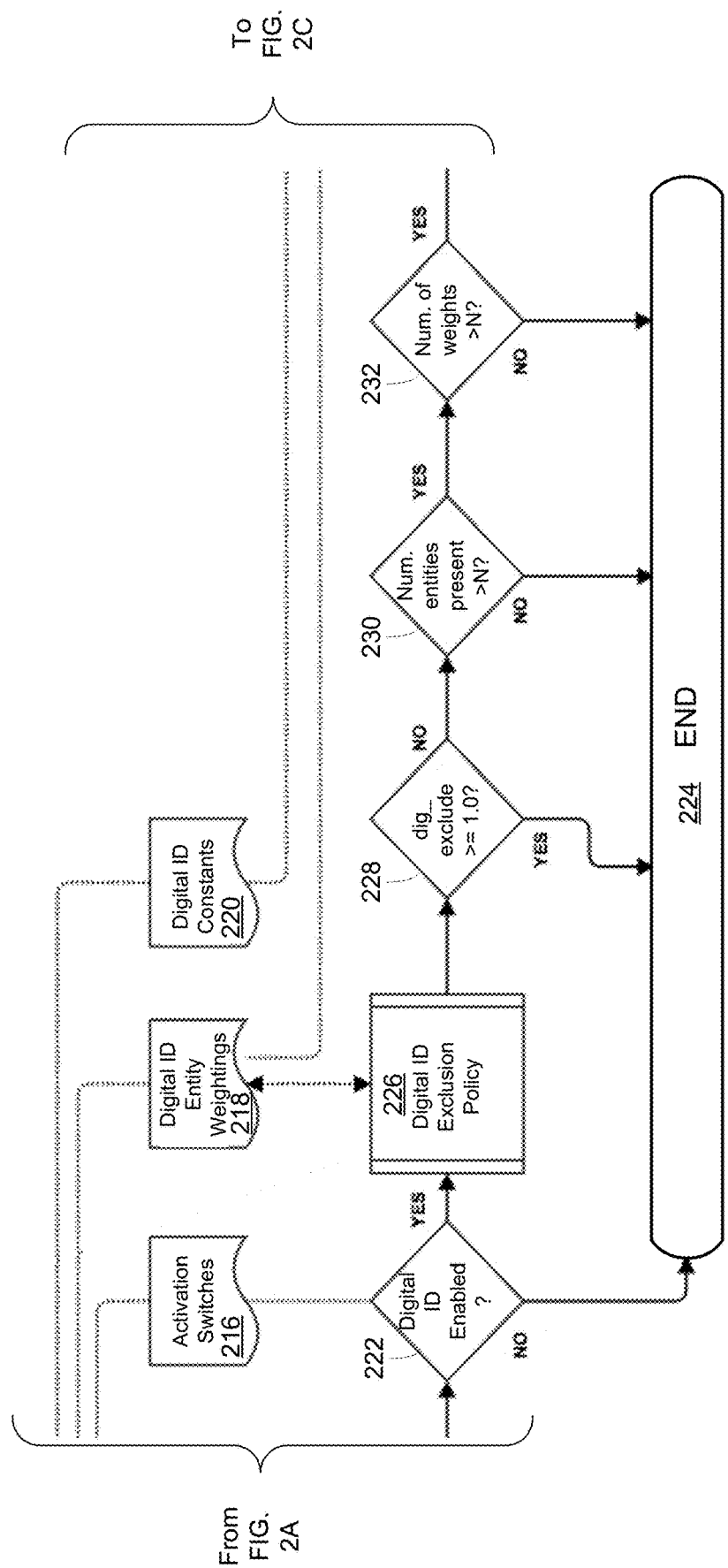
FIG. 2B is part of a block diagram of the example process 200 for building, modifying and/or storing digital identity information, according to an example implementation of the disclosed technology.

FIG. 2B illustrates a filtering portion of the process 200 in which certain configuration parameters (for example, from FIG. 2A) may be utilized to check for appropriate information associated with an entity prior to building time-dependent digital mapping of the attributes related to the entity. In this respect, incomplete or erroneous data may be filtered out so that it is not utilized or propagated through the system. Such initial filtering may increase the efficiency of the process 200. In certain example implementations activation switches 216, digital ID entity weightings 218, and/or the digital ID constants 220 may be the same as the corresponding activation switches 210, digital ID entity weightings 212, and/or digital ID constants 214 as shown in FIG. 2A. In certain example implementations, the activation switches 216, digital ID entity weightings 218, and/or the digital ID constants 220 may be updated throughout the process 200.

In accordance with certain example implementations of the disclosed technology, a certain digital ID may be checked 222 to see if it is enabled for processing, and if not, the process 200 may be terminated 224. In accordance with certain example implementations of the disclosed technology, the check for the enabled digital ID may be controlled by the activation switches 216. If the digital ID is enabled, information related to a digital ID exclusion policy 226 (utilizing input from the digital ID entity weightings 218) may be retrieved and checked, for example, in a test 228 to determine if the digital ID should be excluded; in test 230 to determine if the number of entities present are greater that a predetermined value; and/or in test 232 determine if the number of weightings are above a predetermined value. Otherwise, the process 200 for a particular entity and/or attribute may be terminated 224. In certain example implementations, before any matching takes place, the exclusion policy 226 may be executed. In certain example implementations, the exclusion policy 226 may be utilized to dynamically modify each individual entity weighting to compensate for certain behaviors. In certain example implementations, the exclusion policy 226 can increase or decrease the weighting or "power" assigned to a particular entity within the matching process. In certain example implementations, the exclusion policy 226 may be utilized to abort/prevent a digital ID from being created.

Figure 2C:
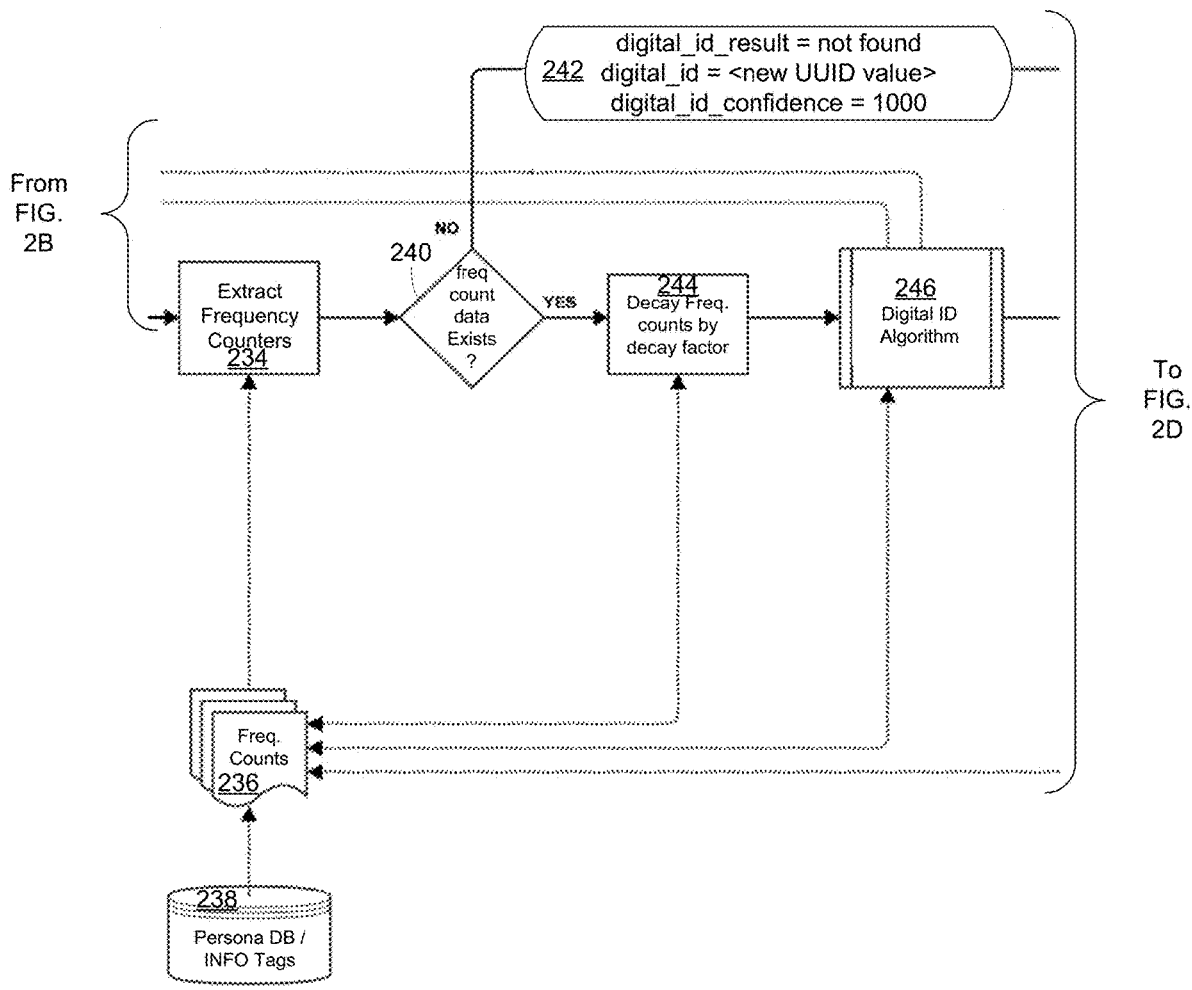
FIG. 2C is part of the block diagram of an example process 200 for building, modifying and/or storing digital identity information, according to an example implementation of the disclosed technology.

FIG. 2C illustrates a continued process 200 in which certain filtered data (for example, data received from the filtering portion of the process 200 as illustrated in FIG. 2B) may be utilized for building, modifying and/or storing digital identity information. According to an example implementation of the disclosed technology, attribute information associated with a digital ID may include temporal and/or frequency information that can be indicative of abnormal or fraudulent behaviour. In certain example implementations, more recent attribute information may receive preferential weighting. For example, an aggregate risk for n connected entities may be expressed as:

$$R = \frac{[f_1 \cdot e^{(-t_1/T_1)} + f_2 \cdot e^{(-t_2/T_2)} + \ldots + f_n \cdot e^{(-t_n/T_n)}]}{[e^{(-t_2/T_i)} + e^{(-t_2/T_2)} + \ldots + e^{(-t_n/T_n)}]},$$

where
  $f_i = -1$; If entity$_i$ has been involved in frauds or blacklisted.
  $f_i = +1$; If entity$_i$ has been whitelisted.
  $f_i = 0$; If entity$_i$ has no good or bad indicator.

A similar approach may be used to determine aggregate risk for n connected attributes and/or activities associated with a particular entity. The term:

$$e^{(-t_i/T_i)}$$

is a decay factor, where $t_i$ is the time since the particular entity/activity/attribute was last seen, and $T_i$ is a decay constant. In an example implementation of the disclosed technology, the decay constant $T_i$ may be selected to provide the appropriate time-weighting, such as a day, a week, a month, etc. $T_i$ may be set with different time decay constant based on the importance of the entity or attribute. The more important the entity/attribute is, the larger the decay constant may be set, which means it has longer impact than other less important entities. The decay factor allows the most recent activities/attributes associated with a digital ID to affect the aggregate risk more than aged activities/attributes. For example, the temporal information and time decay may be utilized for preferentially flagging recent suspicious activity in a use case where a high number of credit card account openings in has been detected for an entity identified by a particular digital ID. In a first case, a legitimate person may be attempting to establish a better credit score by periodically opening new credit card accounts, and they may open a new account every week or ever month in the process. In a second case, a fraudster may have obtained stolen identity information and may attempt to open several credit card accounts in a single day. In both first and second case, a similar number of accounts may be opened, but the second case may be detected and flagged as possible suspicious behavior due to the preferential weighting of the recent temporal information associated with such activities.

Returning now to FIG. 2C, and according to certain example implementations, a digital ID algorithm 246 may be utilized for scoring activities/attributes. In certain example implementations, the digital ID algorithm 246 may be utilized to read entity/activity/attribute data as extracted by a frequency counter 234 when such data is checked 240 and it exists. In certain example implementations, a decay factor 244 (as explained above) may be applied to the temporal entity/activity/attribute. In certain example implementations, the digital ID algorithm 246 may store frequency count information in the frequency count tables 236 on a per-entity basis with persona DB/Info tags 238. In certain example implementations, the digital ID algorithm 246 may utilize a probabilistic voting mechanism to evaluate all of the possible digital IDs and choose/output the digital ID with the highest probability.

Figure 2D:
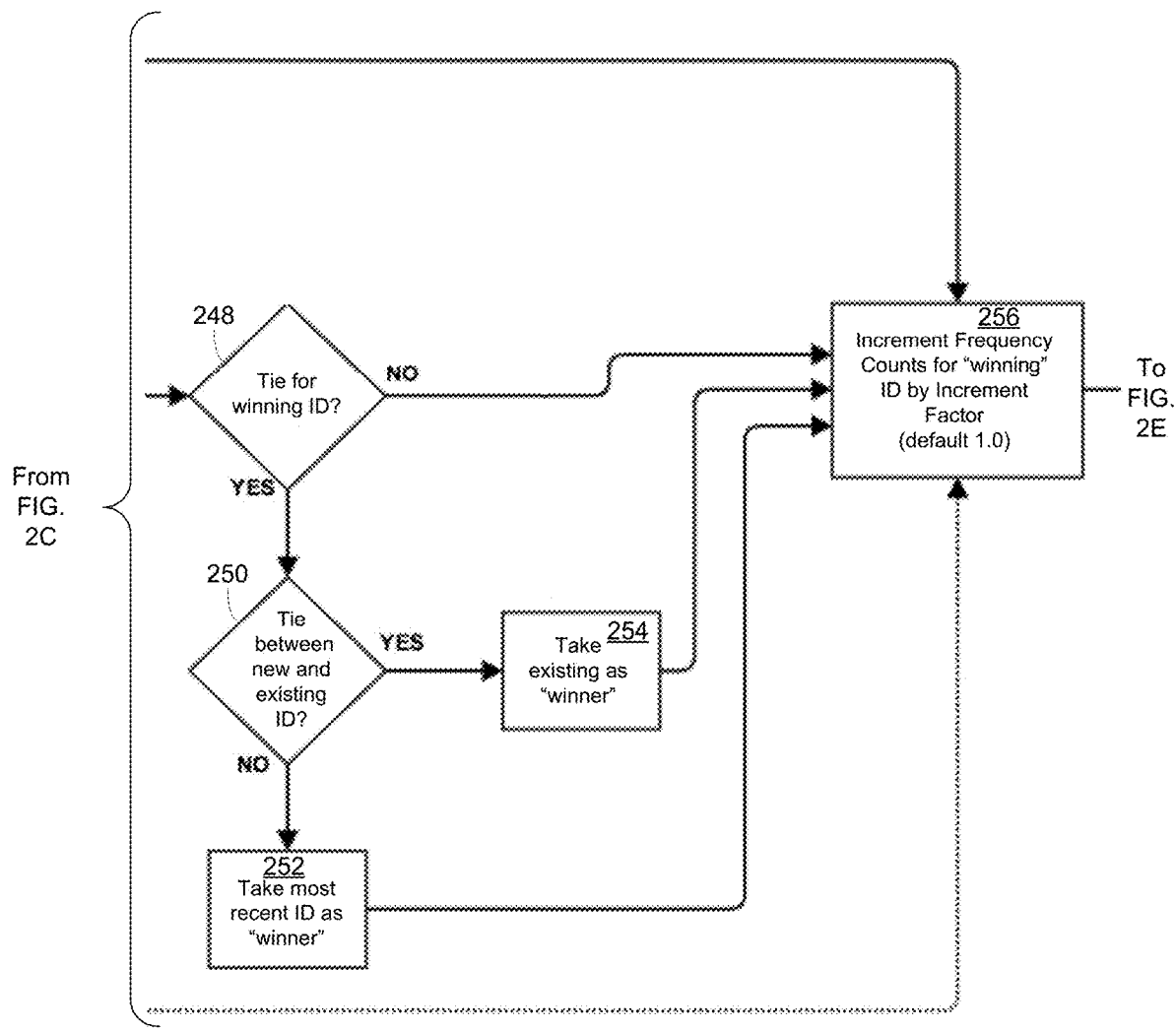
FIG. 2D is part of the block diagram of an example process 200 for building, modifying and/or storing digital identity information, according to an example implementation of the disclosed technology.

FIG. 2D illustrates a continued process 200 in which a digital ID (for example, as received from the previous process 200 as illustrated in FIG. 2C) may be evaluated. For example, a check 248 may be made to determine if two or more digital IDs associated with certain activities have been selected and output by digital ID algorithm 246. If not, a frequency count may be incremented 256 for the digital ID. Otherwise, a check 250 for a tie between a new and existing digital ID may be processed, with the existing digital ID selected 254 as the winner, or the most recent digital ID selected 252 as the winner. As indicated in block 256, a count may be incremented for the winning digital ID.

Figure 2E:
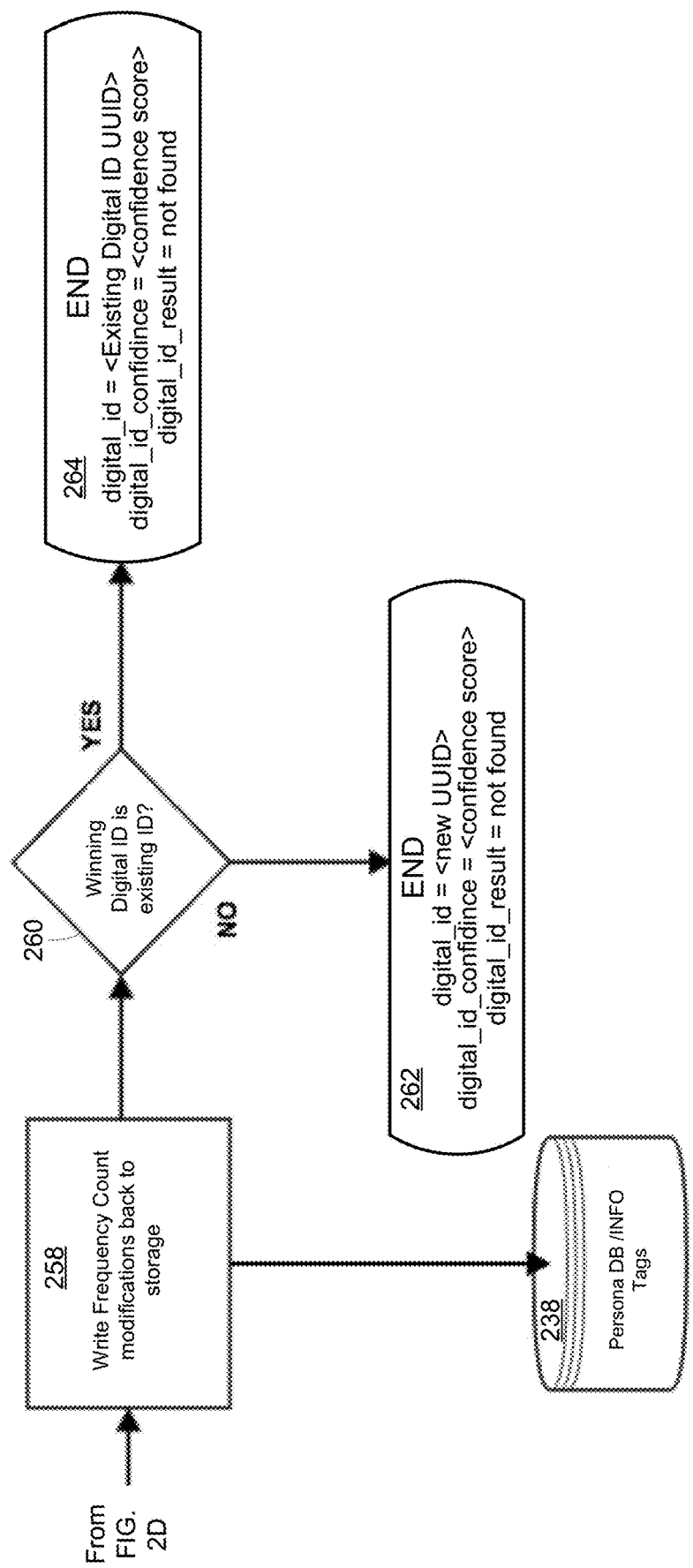
FIG. 2E is part of the block diagram of an example process 200 for building, modifying and/or storing digital identity information, according to an example implementation of the disclosed technology.

FIG. 2E illustrates a continued process 200 in which a frequency count for the winning digital ID (received from the previous process 200 as illustrated in FIG. 2D) is written 258 to the storage 238. In an example implementation, the winning digital ID may be checked 260 to see if it is an existing ID. If not, a new unique identifier may be assigned 262 with a confidence score. Otherwise, the existing digital ID may be assigned 264 a confidence score.

TABLE 1

Digital ID results

| digital_id_result value | Description |
| --- | --- |
| success | The digital ID matched an existing/known Digital ID |
| new_digital_id | A new Digital ID was generated |
| not_enough_attribs | There are not enough attributes present to generate a Digital ID (minimum of 2 entities excluding True IP are needed). Exact ID and Smart ID only count as one entity for this check. |
| low_confidence | If the confidence threshold is enabled and the digital_id_confidence for the digital ID is below the configured threshold, then no digital ID is returned and digital_id_result is set to 'low_confidence'. |
| excluded | The exclusion policy has the ability to prevent the generation of a digital ID. If the exclusion policy decides to block/exclude Digital ID generation for a given transaction, then digital_id_result will be set to 'excluded'. |
| not_enough_weights | The exclusion policy also has the ability to manipulate the weightings for different entities based on behaviors detected by the rules. The exclusion policy can set a weighting to 0 to prevent it from being used within the Digital ID matching algorithm. Because of this a situation exists where there may be enough attributes present to generate a digital ID, but their weightings may have been zeroed out. This separate value is returned in this case to prevent confusion with 'not_enough_attribs" scenario. |

Table 1 above provides additional information for the results of the digital ID, as may be processed in block 262 and/or block 264 of FIG. 2E. In accordance with certain example implementations of the disclosed technology, a sub-set of entities (Account Number, Account Name, Account Login) may be restricted to local-only usage due to a low likelihood of an individual securing the same login/ account name across multiple organizations. For example, John Smith may have signed-up with a first organization several years ago under the login username "johnsmith." Then a recent attempt to sign-up with a second vendor using the same login username may be unsuccessful as "johnsmith" was already taken, so the username "johnsmith723" may be used instead.

In accordance with certain example implementations of the disclosed technology, after a digital ID has been created, certain example implementations of the disclosed technology may utilize the digital ID to separate bad identities from good identities. Such knowledge may be utilized to validate legitimate returning customers and reduce transaction friction. Certain example implementations of the disclosed technology may be utilized to actively block attempts to access an account or conduct a transaction if suspicious behavior is detected. By accurately distinguishing good customers from fraudsters, cybercriminals impersonating legitimate customer may be quickly detected by their attempted fraudulent and/or anomalous transactions.

In certain example implementations, a trust score may be utilized as a comprehensive risk assessment score for digital ID intelligence. Certain example implementations of the trust score may represent fraud risk, threat, vulnerability, and reputation of the digital ID, and may leverage the big data power of a Digital Identity Network and global shared intelligence to generate such score. In certain example implementations, the following analytics components may be built into the trust score for a digital ID: global reason codes, global smart rule variables, digital ID pivoted variables, digital ID confidence scores, fraud data, and/or potential threat data.

In certain example implementations, the trust score may be accessible to customers and can be used directly in the customer policies in making better decisions in identifying trusted consumers to reduce false positives. Certain example implementations of the disclosed technology may utilize the trust score in associated models to improve fraud detection performance.

Figure 3:
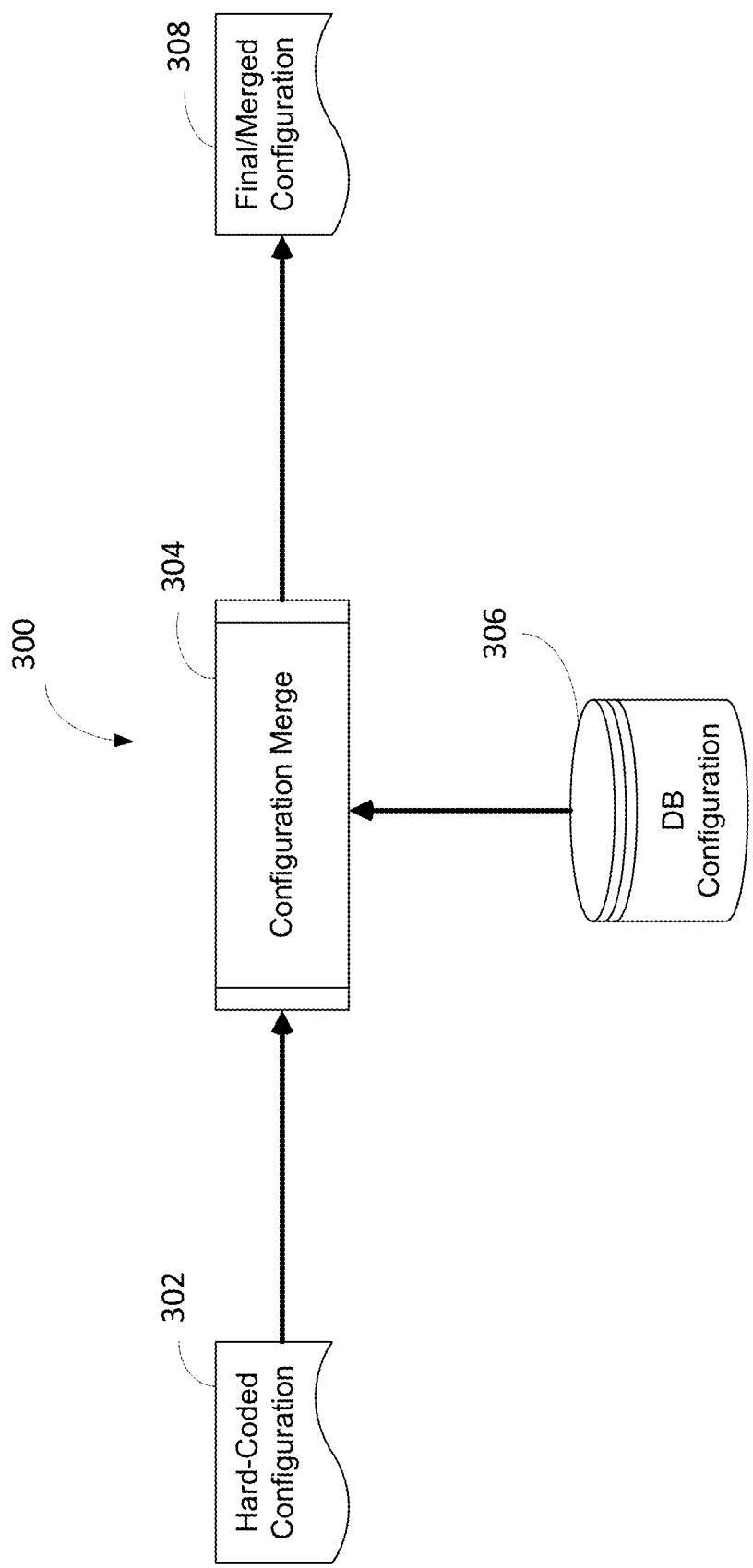
FIG. 3 is a block diagram of an example process 300 for merging configuration data, according to an example implementation of the disclosed technology.

FIG. 3 is a block diagram of an example process 300 for merging configurations for the example process 200 as shown in FIG. 2A, according to an example implementation of the disclosed technology. For example, a hard-coded configuration 302 may be combined or merged 304 with a changeable configuration 306 (that may be stored in a database) to produce a final/merged configuration 308. In this respect, certain example implementations of the disclosed technology provide a flexible and dynamic process for building time-dependent digital ID mappings.

Figure 4:
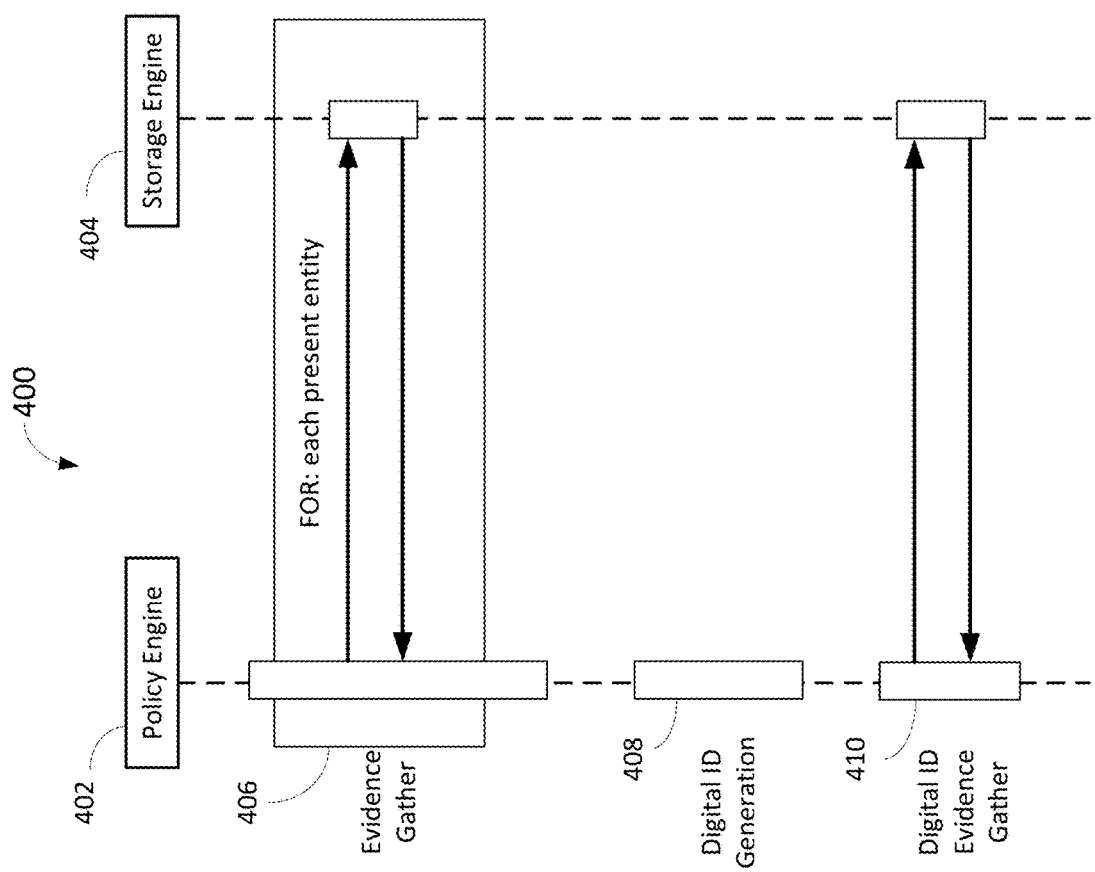
FIG. 4 is a block diagram of an example system and process 400 for gathering evidence and generating digital identity information, according to an example implementation of the disclosed technology.

FIG. 4 is a block diagram of an example system and process 400 for gathering evidence and generating digital identity information, according to an example implementation of the disclosed technology. A policy engine 402, for example, may set parameters for evidence gathering 406, digital ID generation 408, and further evidence gathering 410 once the digital ID has been generated (for example, as discussed above with respect to FIGS. 2C-2E as described above). In certain example implementations, a storage engine 404 may be utilized in conjunction with the evidence gathering steps 406, 410 to control storage and/or retrieval of data related to known attributes and/or activities connected with a given entity. In certain example implementations, the storage engine may access multiple data sources, local and/or remote, to store and/or retrieve the data that may be utilized as evidence. In certain example implementations, the initial evidence gathering 406 may be completed before the digital ID generation 408 is started. In certain example implementations, once the digital ID value has been determined and/or generated 408, then the evidence gathering 410 for the particular digital ID may proceed.

FIG. 5 is an illustrative graphical output mapping 500 of attributes 504 associated with a digital ID 502, according to an example implementation of the disclosed technology. In accordance with certain example implementations of the disclosed technology, any given attribute 504 may represent any one of multiple classes of data related to the digital ID 502. For example, an attribute 504 may represent a name, an email address, a physical address, a phone number, a social security number, an IP address, a digital device identifier, an event, a transaction, an account number, a communication, a connection to another person, an event, travel records, public records, etc. Virtually any detectable activity (online and/or offline) and/or device associated with the digital ID 502 may be represented in the graphical output mapping 500. In certain example implementations, such mapping 500 may represent temporal information associated with the attributes 504. In certain example implementations, suspicious behaviors and/or outliers may be identified in the mapping 500, for example, with certain colors or icon sizes. In certain example implementations, the mapping 500 may provide a unique "digital fingerprint" of an entity represented by the digital ID 502. In certain example implementations, the underlying attribute information used to generate the mapping 500 may be utilized directly or by partner vendors to control account access or transactions that are attempted by the entity related to the digital ID 502. According to certain example implementations of the disclosed technology, account access and/or transactions may be blocked or prevented if detected anomalous, suspicious, or fraudulent behavior is detected.

Figure 6:
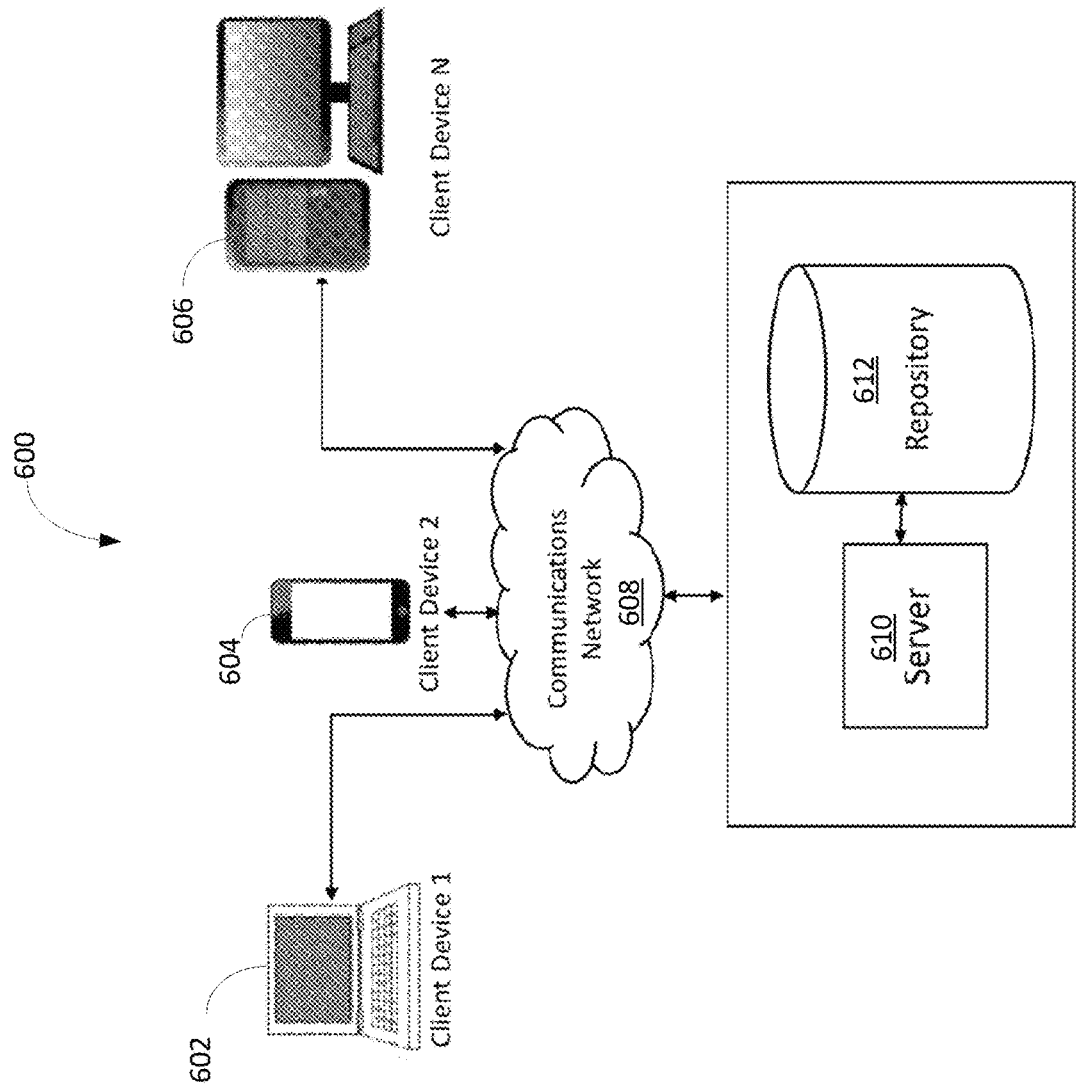
FIG. 6 is a block diagram of a computing system 600, according to an example implementation of the disclosed technology.

FIG. 6 is a block diagram of a computing system 600, according to an example implementation of the disclosed technology. An entity and/or digital ID may be associated with one or more client computing devices, such as a laptop computer 602, a mobile computing device (smartphone) 604, a desktop computer 606, etc. In certain example implementations, the client devices 602, 604, 606, etc., may be in communication (or capable of communicating) with a communications network 608 such as the Internet. In certain example implementations, a server 610 in communication with a storage repository 612 may be in communication with the communication network 608. The server 610 may be embodied as a computing device, as will be explained below with reference to FIGS. 7 and 8.

Figure 7:
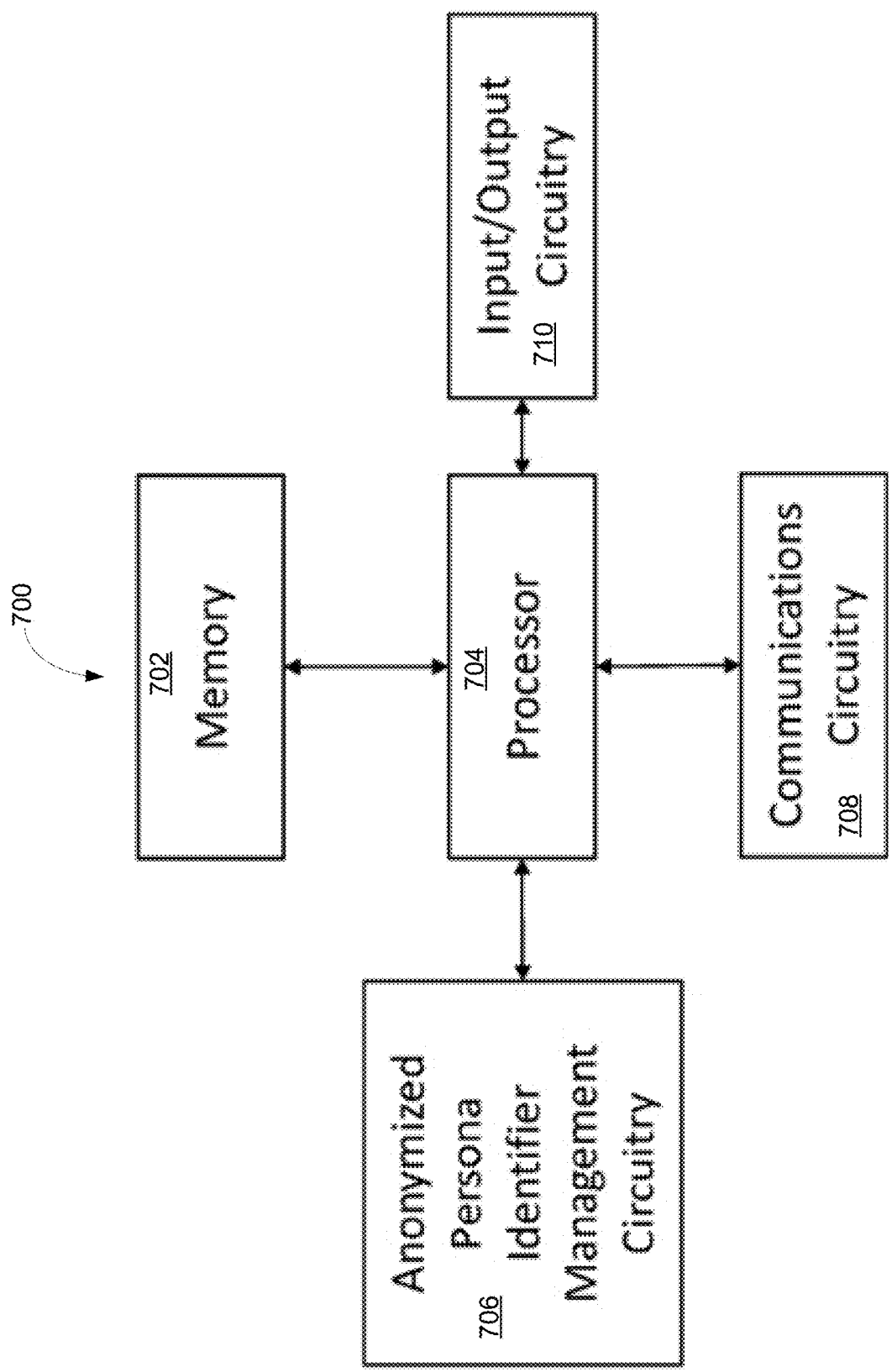
FIG. 7 is a block diagram of a computing system 700, according to an example implementation of the disclosed technology.

FIG. 7 is a block diagram of a computing system 700, according to an example implementation of the disclosed technology. In certain example implementations, the computing system 700 may include a memory 702 in communication with a processor 704. The computing system 700 may include anonymized persona identifier management circuitry 706 in communication with the processor 704. In certain example implementations, the computing system 700 may include input/output circuitry 710 in communication with the processor.

Figure 8:
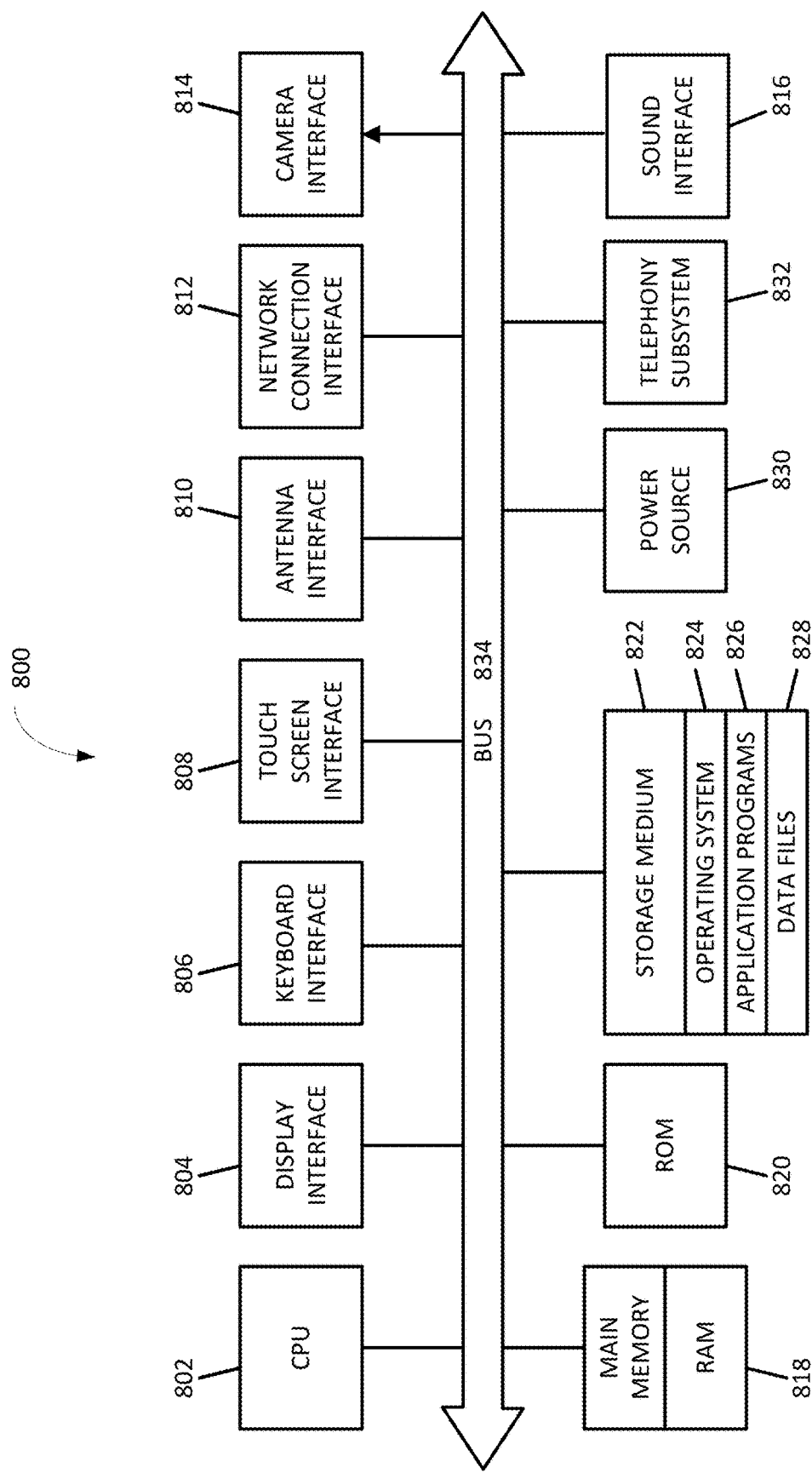
FIG. 8 is a block diagram of a computing device 800, according to an example implementation of the disclosed technology.

FIG. 8 is a block diagram of a computing device 800, according to an example implementation of the disclosed technology. In certain example implementations, the computing device 800 may be embodied as the computing system 700, as shown in FIG. 7. In certain example implementations, the computing device 800 may be embodied as the server 610, as shown in FIG. 6. The computing device 800 of FIG. 8 includes a central processing unit (CPU) 802, where computer instructions are processed; a display interface 804 that acts as a communication interface and provides functions for rendering video, graphics, images, and texts on the display. In certain example implementations of the disclosed technology, the display interface 804 may be directly connected to a local display, such as a touch-screen display associated with a mobile computing device. In another example implementation, the display interface 804 may be configured for providing data, images, and other information for an external/remote display that is not necessarily physically connected to the computing device. For example, a desktop monitor may be utilized for mirroring graphics and other information that is presented on the computing device 800. In certain example implementations, the display interface 804 may wirelessly communicate, for example, via a Wi-Fi channel or other available network connection interface 812 to an external/remote display.

In an example implementation, the network connection interface 812 may be configured as a communication interface, for example, to provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 800 may include a keyboard interface 806 that provides a communication interface to a keyboard. In one example implementation, the computing device 800 may include a pointing device and/or touch screen interface 808. According to certain example implementations of the disclosed technology, the pointing device and/or touch screen interface 808 may provide a communication interface to various devices such as a pointing device, a touch screen, a depth camera, etc. which may or may not be associated with a display.

The computing device 800 may be configured to use an input device via one or more of input/output interfaces (for example, the keyboard interface 806, the display interface 804, the touch screen interface 808, network connection interface 812, camera interface 814, sound interface 816, etc.) to allow a user to capture information into the computing device 800. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor such as an accelerometer or gyroscope, a smartcard, iris reader, fingerprint reader, voiceprint reader, and the like. Additionally, the input device may be integrated with the computing device 800 or may be a separate device.

Example implementations of the computing device 800 may include an antenna interface 810 that provides a communication interface to an antenna; a network connection interface 812 that provides a communication interface to a network. In certain implementations, a camera interface 814 is provided for capturing digital images, for example, from a camera. In certain implementations, a sound interface 816 is provided as a communication interface for converting sound into electrical signals using a microphone and for converting electrical signals into sound using a speaker.

According to example implementations, a random-access memory (RAM) 818 is provided, where computer instructions and data may be stored in a volatile memory device for processing by the CPU 802.

According to an example implementation, the computing device 800 includes a read-only memory (ROM) 820 where invariant low-level system code or data for basic system functions such as basic input and output (I/O), startup, or reception of keystrokes from a keyboard are stored in a non-volatile memory device. According to an example implementation, the computing device 800 includes a storage medium 822 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 824, application programs 826 (including, for example, a web browser application, an invoice extraction module, etc.) and data files 828 are stored. According to an example implementation, the computing device 800 includes a power source 830 that provides an appropriate alternating current (AC) or direct current (DC) to power components. According to an example implementation, the computing device 800 may include and a telephony subsystem 832 that allows the device 800 to transmit and receive sound over a telephone network. The constituent devices and the CPU 802 communicate with each other over a bus 834.

In accordance with an example implementation, the CPU 802 has appropriate structure to be a computer processor. In one arrangement, the computer CPU 802 may include more than one processing unit. The RAM 818 interfaces with the computer bus 834 to provide quick RAM storage to the CPU 802 during the execution of software programs such as the operating system application programs, and device drivers. More specifically, the CPU 802 loads computer-executable process steps from the storage medium 822 or other media into a field of the RAM 818 in order to execute software programs. Data may be stored in the RAM 818, where the data may be accessed by the computer CPU 802 during execution. In one example configuration, the device 800 includes at least 128 MB of RAM, and 256 MB of flash memory.

The storage medium 822 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 800 to access computer-executable process steps, application programs and the like (such as the processes described in FIGS. 1-5) that are stored on removable and non-removable memory media, to off-load data from the device 800 or to upload data onto the device 800. A computer program product, such as one utilizing a communication system may be tangibly embodied in storage medium 822, which may comprise a machine-readable storage medium.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra-mobile PCs (UMPCs), etc.

Figure 9:
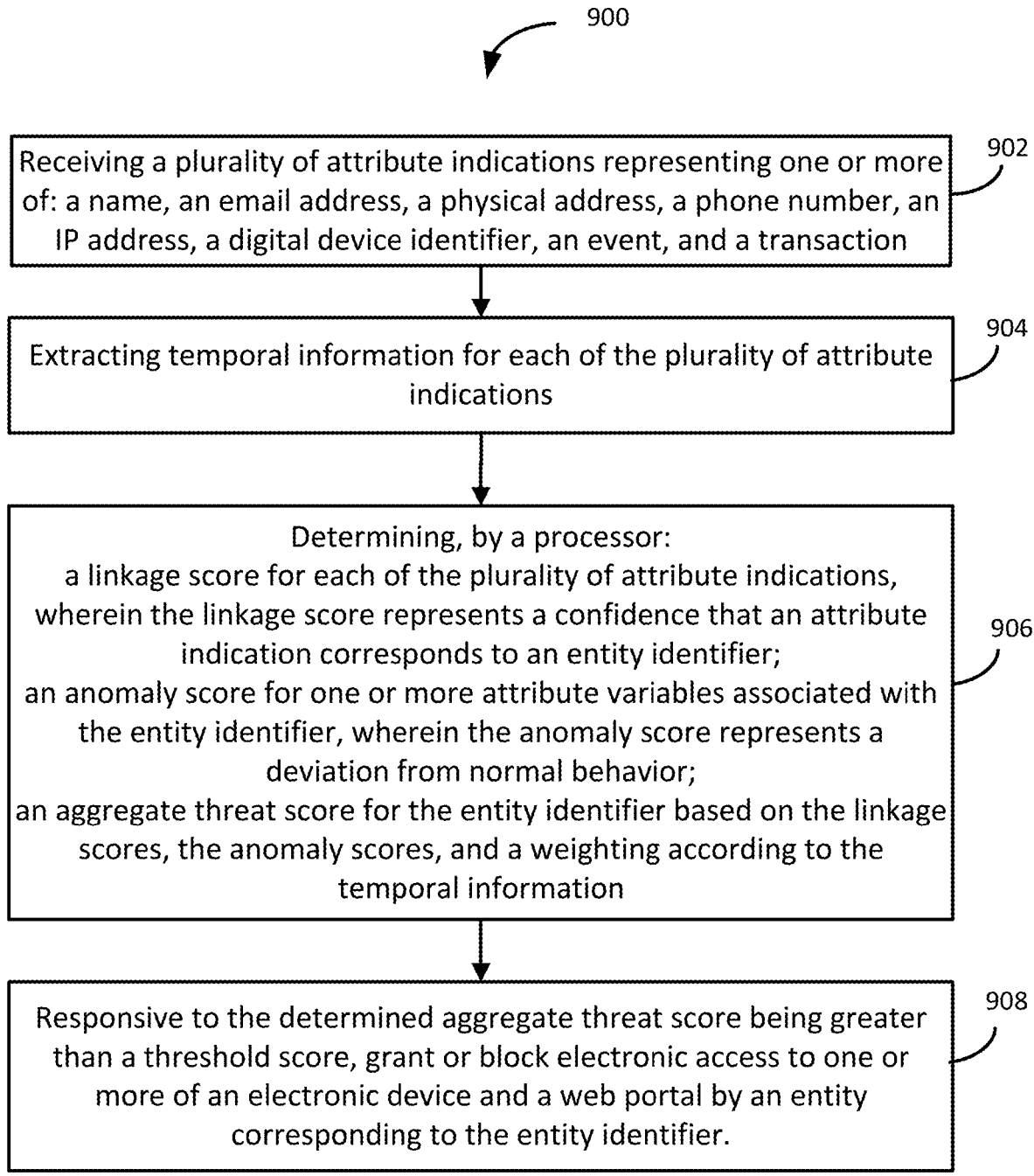
FIG. 9 is a flow diagram of a method 900, according to an example implementation of the disclosed technology.

FIG. 9 is a flow diagram of a method 900, according to an example implementation of the disclosed technology. In block 902, the method 900 may include receiving a plurality of attribute indications representing one or more of: a name, an email address, a physical address, a phone number, an IP address, a digital device identifier, an event, and a transaction. In block 904 the method 900 includes extracting temporal information for each of the plurality of attribute indications. In block 906, the method 900 includes determining, by a processor: a linkage score for each of the plurality of attribute indications, wherein the linkage score represents a confidence that an attribute indication corresponds to an entity identifier; an anomaly score for one or more attribute variables associated with the entity identifier, wherein the anomaly score represents a deviation from normal behavior; and an aggregate threat score for the entity identifier based on the linkage scores, the anomaly scores, and a weighting according to the temporal information. In block 908, and responsive to the determined aggregate threat score being greater than a threshold score, the method 900 may include granting or blocking electronic access to one or more of an electronic device and a web portal by an entity corresponding to the entity identifier.

In certain example implementations, the one or more attribute variables can include a number or frequency of one or more of: devices, electronic messages, and transactions associated with the entity identifier.

In certain example implementations, the aggregate threat score is further based on known instances of fraud associated with the entity identifier.

According to an example implementation of the disclosed technology, the aggregate threat score includes time-based decay weighs according to the temporal information.

In certain example implementations, the entity is one or more of a human, a household, and a family.

In certain example implementations, the method 900 may include graphically representing the attribute indications corresponding to the entity identifier.

In certain example implementations, the plurality of attribute indications can represent assets that are attributed to the entity identifier.

According to certain example implementations of the disclosed technology, different modeling approaches may be utilized for implementing trust scores according to a digital ID depending on the available data, desired accuracy, and/or time or computing constraints.

In one approach, a confidence score and risk assessment may be built on existing event averages of confidence scores and known fraud/blacklist indicators for entities associated with the digital ID. The confidence scores utilized in this approach may already be predictive when applied to fraud detection. For example, there may be a high correlation between confidence scores and the fraud truth data. In this implementation, the confidence scores may be enhanced or mingled with fraud information collected from customers and/or from a global intelligence source. In accordance with certain example implementations of the disclosed technology, average confidence scores for the past m events of the same digital ID may be converted to a log-odds score as follows:

$$AvgConf\_m = \Sigma_{i=0}^{m} ConfScore_i/m$$

$$ProbConf\_m = AvgConf\_m/10{,}000$$

$$\log odd\_Conf\_m = \ln(ProbConf\_m/1 - ProbConf\_m).$$

As discussed above with respect to FIG. 2C, an aggregate risk for n connected entities may be expressed as:

$$R = \frac{[f_1 \cdot e^{(-t_1/T_1)} + f_2 \cdot e^{(-t_2/T_2)} + \ldots + f_n \cdot e^{(-t_n/T_n)}]}{[e^{(-t_1/T_i)} + e^{(-t_2/T_2)} + \ldots + e^{(-t_n/T_n)}]},$$

where $f_i = -1$; If entity$_i$ has been involved in frauds or blacklisted.
$f_i = +1$; If entity$_i$ has been whitelisted.
$f_i = 0$; If entity$_i$ has no good or bad indicator.

The two log-odds scores may be combined with a blending factor to generate an overall score, which may be converted it back to probability trust score:

$$\text{Trust\_prob} = \frac{1}{1 + e^{(-logodd\_Conf\_m - \alpha \cdot R)}}$$

In certain example implementations, this approach for generating a trust score may be easiest to implement, and it leverages the global intelligence and customer fraud feedback, which are generally accurate. In an example implementation, the most recent events and their confidence scores for the same digital ID may be utilized, the event-based temporal decay can be built into average calculations so that the most recent scores will have larger influence than earlier scores.

Table 2 below summarizes corresponding reason codes that may be utilized in checking if an entity associated with a digital ID has been blacklisted.

troid may be constructed on event attributes directly, or on behavior variables, etc. In certain example implementations, the centroid model can be tuned based on fraud risk data to improve the quality of trust scores. According to an example implementation of the disclosed technology, an anomaly score may be generated using the unsupervised approach, for example, by utilizing newly enabled digital ID based variables. In this example implementation, a score term may be added to the above log-odds score with another blending factor. The digital ID variables may be directly scaled with extreme quantiles to obtain anomaly indicators. The scaling may utilize the following formula:

$$Q(v) = \frac{v - q_{low}}{q_{high} - q_{low}},$$

where v is the digital ID variable, $q_{low}$ is lower percentile (e.g., 95th percentile of v), and $q_{high}$ is the higher percentile (e.g., 99th percentile of v).

Other candidate scaling methods including the standard z-scaling with mean and standard deviation:

$$Z(v) = \frac{v - \text{mean}}{stdev},$$

TABLE 2

Blacklist reason codes

| Summary Reason Code | TMX Reason Code | Description of rule |
| --- | --- | --- |
| Device_Negative_History | _SmartID_Global_Blacklist | This reason code implies that this particular Smart ID has been found in the Global Blacklist. |
| Device_Negative_History | _ExactID_Global_Blacklist | This reason code implies that this particular Exact ID has been found in the Global Blacklist. |
| IP_Negative_History | _TrueIP_Global_Blacklist | This reason code implies that this particular True IP was found in the Global Blacklist. |
| IP_Negative_History | _InputIP_Global_Blacklist | This reason code implies that this particular Input IP was found in the Global Blacklist. |
| IP_Negative_History | _ProxyIP_Global_Blacklist | This reason code implies that this particular Proxy IP was found in the Global Blacklist. |
| Identity_Negative_History | _Email_Global_Blacklist | This reason code implies that this particular Email ID was found in the Global Blacklist. |
| Identity_Negative_History | _CC_Global_Blacklist | This reason code implies that this particular Credit Card was found in the Global Blacklist. |
| Identity_Negative_History | _Phone_Global_Blacklist | This reason code implies that this particular Phone number was found in the Global Blacklist. |

In a second approach, an unsupervised anomaly detection scoring model may be utilized to build the trust score utilizing a centroid approach to monitor normal behavior vs. abnormal behavior. In this second approach, a likelihood of data being abnormal with respect to the centroid may be calculated as a normalized score. In certain example implementations, the scores may be aggregated to generate the final trust score. In certain example implementations, cenor MAD scaling to get modified Z-Scores (Boris Iglewicz and David Hoaglin, 1993):

$$M(v) = \frac{0.6745 \times (v - \text{medium})}{mad}.$$

In certain example implementations, an anomaly may represent a large deviation from the normal behavior of the digital ID, and certain implementations may quantify the anomaly with the scaling factor. For example, the variables associated with the digital ID can be the number of devices associated with the digital ID; a number of emails associated with the digital ID; a number of phones associated with the digital ID on day/week/month. As an example, if the number of detected email communications associated with the digital ID for a recent week is 30 or more than the number of emails detected for the past week, such activity may be suspicious and may trigger an anomaly contribution. Such anomalies may be aggregated using summation or a linear combination with respective coefficients:

$$S=[\max(Q(v_1),0)+\max(Q(v_2),0)+ \ldots +\max(Q(v_n),0)],$$

$$S=[s_1 \cdot \max(Q(v_1),0)+s_2 \cdot \max(Q(v_2),0)+ \ldots +s_n \cdot \max(Q(v_n),0)],$$

where n variables are selected.

In certain example implementations, the three log-odds scores may be combined with two blending factors of risk info and the anomaly score to generate the final overall score, which may be converted back to the probability trust score.

$$\text{Trust\_prob} = \frac{1}{1+e^{(-logodd\_Conf\_m-\alpha \cdot R-\beta \cdot S)}}.$$

In another approach, score fusion may be utilized to combined score from components. For example, an average confidence score may be combined with an age factor score in the log odds space. In certain example implementations, the following steps may be utilized:

(1) Convert the Average Confidence Score to a Logodds Average Confidence Score:

ProbConf=AvgConf/10,000 log odd_Conf=ln(ProbConf/1−ProbConf)

(2) Convert the Age Factor Score to a Logodds Age Factor Score:

ProbAge=AvgScore/10,000 log odd_Age=ln(ProbAge/1−ProbAge)

(3) Combine the two Logodds Scores with blending coefficients to generate an overall Logodds score:

log odd_Sum=α·log odd_Conf+β·log odd_Age

The two parameters α and β may be learned through tuning (for example, based on customer truth data). In certain example implementations, the parameters may be set such that:

α=0.7 and β=0.3.

(4) Reverse back to probability score, and multiply 10,000 to get the trust score in range.

$$\text{Trust\_prob} = \frac{1}{1+e^{(-logodd\_Sum)}},$$

Trust_Score = Trust_Prob×10,000.

In certain example implementations, the time decay terms may be omitted for simplification, resulting in a simplified version of the aggregate risk for n connected entities as:

$$R = \frac{[f_1+f_2+\ldots+f_n]}{n}.$$

In accordance with certain example implementations of the disclosed technology, this simplified version may be added to the log odd_sum of the previous linear terms to provide a risk adjustment to the overall trust score. In this implementation, the trust probability equation may be represented as:

$$\text{Trust\_prob} = \frac{1}{1+e^{(-logodd\_Sum-R)}}$$

With the final trust score calculated as:

Trust_Score=Trust_Prob×10,000

Certain example implementations of the disclosed technology may provide the following technical benefits and/or technical functions: (a) both online and offline data attributes may be utilized together to form a dynamic and unique persona identifier (ID) that is anonymized; the generative identity resolution process may be driven by real-world digitized interactions, not just data mapping to fields; a digital identity graph, leveraging machine learning, may connect the disparate online and offline attributes and express them as one unique persona identifier that is anonymized; complete anonymity is ensured with both the persona identifiers and underlying data attributes; the system is built upon tokenized, encrypted identity attributes that cannot be hacked or reversed into personally identifiable information (PII); a view of a persona identity and attributes may be provided through the merging of the offline and online data; a consistent, universal, and frictionless approach may be utilized across consumer touch points spanning new account openings, login transactions, and payment transactions.

Given a resolved digital identity and its activities in the Internet and mobile channels, a set of interface and analysis features are provided by embodiments disclosed herein for use in fraud prevention, identification, user classification with potential to pursue other use cases such as credit evaluation, cross device ad targeting and others.

According to an example implementation of the disclosed technology, the anonymized persona identifiers according to the disclosed technology are: (a) stable and representative; (b) accurate an encompassing; (c) explainable and relevant; and (d) safe.

The anonymized persona identifiers according to the disclosed technology resistant to contamination by shared elements like a shared IP address, shared email, shared device). As a guidance for step one 90% of entities may need to be singular, 8% can belong to same household or place of work, 2% can be outright wrong. In other words, false positive tolerance for incorrect identity resolution i.e. a proportion of the population, will be able to be individually recognized vs households or organizations Given that users often have multiple assets of each class e.g. different private emails, work emails, lived in different homes, the concept of anonymized persona identifiers may only be as useful as it is able to create a singular entity that strongly correlates the assets. Without such correlation, there may be no information gain and value beyond the single tracked attribute. As a guidance the entities should converge at 90% single anonymized persona identifier for single person, 8% 2 anonymized persona identifiers for single person and 2% with 3 or more.

The anonymized persona identifier may inspire confidence in the use of data. The data required to resolve an entity and the data attached to the entity may need to be current to the extent possible. As a high-level guidance entity resolution data (which emails belong to which anonymized persona identifier) can be current within 48 hours while events and assertions connected to the anonymized persona identifier should be near real time. The disclosed technology relates to an event-driven identity resolution process that may need to maintain global state in-order to ensure that each event is both a 'match' process and an 'insert' process. For example, a hacker can hit a user account in China and Australia seconds apart, and the global identity resolution may need to happen in real-time such that the same attacker is accurately identified, and the second attack can potentially be more thoroughly averted.

As identities may have different transient properties, a large divergence in identity linkages in a short period of time may indicate an attack on an identity. Certain example implementations of the disclosed technology provide the ability to resolve the longer-term stable identity while either flagging, ignoring, or dissolving short lived associations.

As used herein, the terms "data," "content," "information," and similar terms may be used interchangeably to refer to data capable of being transmitted, received, and/or stored in accordance with the disclosed technology. Thus, use of any such terms should not be taken to limit the spirit and scope of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" or "computing device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "human identity," "user," "client," "consumer," and "customer" may be used interchangeably to refer, without limitation, to a human, client, customer, purchaser, shopper, user and the like who may be using any number of client devices and/or online identities to receive and interact with networked digital content.

The term "anonymized persona identifier" refers to a digital identifier associated with a particular human, household, or family, whereby the anonymized persona identifier provides a singular identifier that is associated with multiple digital transactions and digital identities associated with the particular human. In some embodiment, an anonymized persona identifier is based upon deterministic linkages (e.g., a computing device, an email address, a telephone number, a credit card hash). Associated with an anonymized persona identifier may be one or more of personal assets (e.g., email, phone numbers, name, physical addresses (home, work)), digital assets: privately used devices, privately used IP addresses, and events and activities (i.e., transaction) that use those assets and can positively be attributed to a person with high degree of confidence.

In some embodiments, entities associated with an anonymized persona identifier are listed in Table 4.

TABLE 3

Entities Associated with An Anonymized Persona Identifier

| Entity Type | Scope |
| --- | --- |
| Exact ID | Local & Global |
| Smart ID | Local & Global |
| Account Email | Local & Global |
| Account Telephone | Local & Global |
| Account Login | LOCAL ONLY |
| SSN Hash | Local & Global |
| Account Address | Local & Global |
| Shipping Address | Local & Global |
| Credit Card Hash | Local & Global |
| Account Number | LOCAL ONLY |
| Account Name | LOCAL ONLY |
| ACH Number | Local & Global |

In certain embodiments, an anonymized persona can be associated with a classification. The classification may, in some examples, be one or more of an individual, a household, and a family.

In some embodiments, an anonymized persona identifier can be a standard entity in the system in terms of availability in rules. This implies it is available for all policy execution objects and rules.

In some embodiments, an anonymized persona identifier is associated with one or more scores.

The term "reputation scores" encompasses one or more of confidence scores, threat scores, first party reputation scores, ensemble scores, transaction event scores.

The term "threat score" refers to a numerical value associated with a likelihood of identity theft happening to an entity associated with an anonymized persona identifier.

The term "first party reputation score" refers to a specific rating associated with an entity associated with an anonymized persona identifier. As an example, a first party reputation score may comprise a credit score.

The term "ensemble score" refers to a combination of one or more scores described herein that is used to rate the trustworthiness of an entity associated with an anonymized persona identifier.

The term "transaction event score" refers to a numerical value assigned to an anonymized persona identifier that takes into account the entity (possibly the scores) and the context of the event being evaluated to provide a risk score or other types of metric that support a decision that is contextual to the current event.

The term "confidence score" refers to a numerical value assigned to a linkage between a digital identifier or transaction and an anonymized persona identifier. In embodiments, a confidence score may be based upon various dimensions such as: an age of the digital identifier or transaction; an age of a relationship between the digital identifier or transaction with the anonymized persona identifier; a transaction type (e.g., an authentication transaction, a registration transaction); transaction volume, frequency, and decisions (e.g., negative or positive); an industry associated with the digital identifier or transaction.

The term "linkage" refers to an association made between two or more identifiers or other digital pieces of information.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

The terms "user interface" and "UI" refer to a programmatic display for enabling the interaction between humans and a computing device. The goal of user interface design is to produce a user interface which makes it easy (self-explanatory), efficient, and enjoyable (user-friendly) to operate a computing device in a way which produces a desired result. This generally means that the operator needs to provide minimal input to achieve the desired output, and also that the computing device minimizes undesired outputs to the human. In the present embodiments, performance metrics can be displayed using a user interface. In addition, scoring statistics can be gathered and when machine learning model performance crosses a particular threshold an alert can be displayed on the user interface.

The term "API" refers to an Application Programming Interface (API), which is a set of subroutine definitions, protocols, and tools for building application software. An API is a set of clearly defined methods of communication between various software components. An API may be for a web-based system, operating system, database system, computer hardware or software library. An API specification can take many forms, but often includes specifications for routines, data structures, object classes, variables or remote calls. POSIX, Microsoft Windows API, the C++ Standard Template Library and Java APIs are examples of different forms of APIs.

Embodiments of the present disclosure enable fraud detection and other analysis in a visual manner, where the analysis is based upon all data associated with an anonymized persona identifier.

FIGS. 5-12 illustrate exemplary interfaces for use with embodiments of the present disclosure. In some embodiments, a digital identity graph is presented that provides a description of an entity associated with an anonymized persona identifier. The digital identity graph comprises an illustration of which elements comprise the entity associated with the anonymized persona identifier. The digital identity graph illustrates the elements in a way that maintains the privacy of the entity by using tokenization. The digital identity graph also illustrates an evolution of the entity associated with the anonymized persona identifier over time. Examples of such evolutionary data include when and where digital assets were added and what an entity looked like on a certain date. Evolutionary in that the change of relationships is as significant as the relationships themselves, but generative in that identifiers are created and merged and deleted dynamically and automatically based on global interactions. The digital identity graph, in some embodiments, describes events associated with the entity associated with the anonymized persona identifier. Such events may be filtered by which assets where used, the confidence score of the entity at the time of the event, and attachment of participating digital assets at time of event. Events may also be filtered by event attributes including one or more of: event time, event type, event traceability.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

As will be appreciated, any such computer program instructions and/or other type of code may be loaded onto a computer, processor, or other programmable apparatus's circuitry to produce a machine, such that the computer, processor, or other programmable circuitry that execute the code on the machine create the means for implementing various functions, including those described herein.

It is also noted that all or some of the information presented by the example displays discussed herein can be based on data that is received, generated, and/or maintained by one or more components of apparatuses herein. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "data processing apparatus," "computing devices," and "mobile computing devices" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   one or more processors;
   memory in communication with the one or more processors;
   instructions stored in the memory that, when executed by the one or more processors, cause the system to:
      receive a plurality of attribute indications representing one or more of: a name, an email address, a physical address, a phone number, an IP address, a digital device identifier, an event, and a transaction;
      extract temporal information for each of the plurality of attribute indications; determine a linkage score for each of the plurality of attribute indications, wherein the linkage score represents a confidence that an attribute indication corresponds to an entity identifier;
      determine an anomaly score for one or more attribute variables associated with the entity identifier, wherein the anomaly score represents a deviation from normal behavior;
      determine an aggregate threat score for the entity identifier based on the linkage scores, the anomaly scores, and a time-based decay weighting according to the temporal information; and
      responsive to the determined aggregate threat score being greater than a threshold score, grant or block electronic access to one or more of an electronic device and a web portal by an entity corresponding to the entity identifier.

2. The system of claim 1, wherein the one or more attribute variables comprise a number or frequency of one or more of: devices, electronic messages, and transactions associated with the entity identifier.

3. The system of claim 1, wherein the aggregate threat score is further based on known instances of fraud associated with the entity identifier.

4. The system of claim 1, wherein the entity is one or more of a human, a household, and a family.

5. The system of claim 1, further comprising a display configured to graphically represent the attribute indications corresponding to the entity identifier.

6. The system of claim 1, wherein the plurality of attribute indications further comprises assets that are attributed to the entity identifier.

7. A computer-implemented method, comprising:
   receiving a plurality of attribute indications representing one or more of: a name, an email address, a physical address, a phone number, an IP address, a digital device identifier, an event, and a transaction;
   extracting temporal information for each of the plurality of attribute indications;
   determining, by a processor:
      a linkage score for each of the plurality of attribute indications, wherein the linkage score represents a confidence that an attribute indication corresponds to an entity identifier;
      an anomaly score for one or more attribute variables associated with the entity identifier, wherein the anomaly score represents a deviation from normal behavior;
      an aggregate threat score for the entity identifier based on the linkage scores, the anomaly scores, and a time-based decay weighting according to the temporal information; and
      responsive to the determined aggregate threat score being greater than a threshold score, grant or block electronic access to one or more of an electronic device and a web portal by an entity corresponding to the entity identifier.

8. The method of claim 7, wherein the one or more attribute variables comprise a number or frequency of one or more of: devices, electronic messages, and transactions associated with the entity identifier.

9. The method of claim 7, wherein the aggregate threat score is further based on known instances of fraud associated with the entity identifier.

10. The method of claim 7, wherein the entity is one or more of a human, a household, and a family.

11. The method of claim 7, further comprising outputting to a display, a graphical representation of the attribute indications corresponding to the entity identifier.

12. The method of claim 7, wherein the plurality of attribute indications further comprises assets that are attributed to the entity identifier.

13. A non-transitory computer readable storage medium storing instructions computer-executable instructions that, when executed by one or more processors, cause the one or more processors to perform a method comprising:
   receiving a plurality of attribute indications representing one or more of: a name, an email address, a physical address, a phone number, an IP address, a digital device identifier, an event, and a transaction;
   extracting temporal information for each of the plurality of attribute indications;
   determining, by a processor:
      a linkage score for each of the plurality of attribute indications, wherein the linkage score represents a confidence that an attribute indication corresponds to an entity identifier;

an anomaly score for one or more attribute variables associated with the entity identifier, wherein the anomaly score represents a deviation from normal behavior;

an aggregate threat score for the entity identifier based on the linkage scores, the anomaly scores, and a time-based decay weighting according to the temporal information; and responsive to the determined aggregate threat score being greater than a threshold score, grant or block electronic access to one or more of an electronic device and a web portal by an entity corresponding to the entity identifier.

14. The non-transitory computer readable storage medium of claim 13, wherein the one or more attribute variables comprise a number or frequency of one or more of: devices, electronic messages, and transactions associated with the entity identifier.

15. The non-transitory computer readable storage medium of claim 13, wherein the aggregate threat score is further based on known instances of fraud associated with the entity identifier.

16. The non-transitory computer readable storage medium of claim 13, wherein the entity is one or more of a human, a household, and a family.

17. The non-transitory computer readable storage medium of claim 13, further comprising outputting to a display, a graphical representation of the attribute indications corresponding to the entity identifier.

* * * * *